United States Patent
Kim et al.

(10) Patent No.: US 11,348,454 B2
(45) Date of Patent: May 31, 2022

(54) DEVICE AND METHOD FOR CALCULATING AIR POLLUTANT EMISSIONS FROM ROAD MOBILE SOURCE

(71) Applicants: Seoul Institute of Technology, Seoul (KR); Seoul Metropolitan Government, Seoul (KR)

(72) Inventors: Kyung Won Kim, Daegu (KR); Joo Yeon Lee, Seoul (KR); Dong June Kim, Seoul (KR)

( * ) Notice: Subject to any disclaimer, the term of this patent is extended or adjusted under 35 U.S.C. 154(b) by 0 days.

(21) Appl. No.: 17/111,596

(22) Filed: Dec. 4, 2020

(65) Prior Publication Data

US 2022/0139216 A1     May 5, 2022

(30) Foreign Application Priority Data

Oct. 30, 2020    (KR) .......................... 10-2020-143592

(51) Int. Cl.
    *G08G 1/017*          (2006.01)
    *G06V 20/58*          (2022.01)

(52) U.S. Cl.
    CPC ......... *G08G 1/0175* (2013.01); *G06V 20/584* (2022.01); *G06V 2201/08* (2022.01)

(58) Field of Classification Search
    CPC .............. G08G 1/0175; G06V 20/584; G06V 2201/08; G06V 20/625; G01N 21/3504
    USPC ....................................................... 348/148
    See application file for complete search history.

(56) References Cited

U.S. PATENT DOCUMENTS

| | | | | |
|---|---|---|---|---|
| 5,210,702 A | * | 5/1993 | Bishop | G01N 21/33 250/338.5 |
| 6,307,201 B1 | * | 10/2001 | Didomenico | G01N 21/3504 250/338.5 |
| 2006/0064255 A1 | * | 3/2006 | Johnson | G01N 21/3504 702/25 |
| 2017/0131202 A1 | * | 5/2017 | McClintock | H04N 7/183 |

FOREIGN PATENT DOCUMENTS

| | | |
|---|---|---|
| KR | 10-2011-0080208 | 7/2011 |
| KR | 10-2014-0096211 | 8/2014 |
| KR | 10-2015-0076307 | 7/2015 |

OTHER PUBLICATIONS

"Air Quality" CEQR Technical Manual, Chapter 17, Jan. 2012 Edition (REV. Jun. 5, 2013).*
English Specification of 10-2015-0076307.
English Specification of 10-2011-0080208.
English Specification of 10-2014-0096211.

* cited by examiner

*Primary Examiner* — Nathnael Aynalem
(74) *Attorney, Agent, or Firm* — Antonio Ha & U.S. Patent, LLC

(57) ABSTRACT

According to an embodiment, a system for calculating air pollutant emission comprises a sensor device installed in an regional section and obtaining a captured image of a vehicle passing through the regional section, an external server storing vehicle specification information, and a management server identifying the vehicle based on the captured image provided from the sensor device, obtaining the vehicle specification information for the identified vehicle from the external server, calculating air pollutant emission for each emission source using the vehicle specification information, and providing statistical information for the air pollutant emission.

7 Claims, 26 Drawing Sheets

Fig. 21 definition ▶ Hot start emission is the amount of air pollutants emitted when automobile engine is pre-heated and is obtained by multiplying emission factor (Ef) by daily driving distance (VKT)
Feature ▶ This research used actual driving distance on the test road, instead of VKT, to calculate hot start emission
items ▶ CO, VOC, NOx, PM-10, PM-2.5 hot start emission calculation module

| | | | | | | |
|---|---|---|---|---|---|---|
| vehicle type | 6 | passenger car | van | bus | freight car | special | RV |
| vehicle details | 21 | minicompact/small/ medium/large | minicompact/small/ medium/large/special | bus | minicompact/small/medium/ large/special/dump truck | rescue/ towing/others | small/medium |
| fuel used | 5 | diesel | gasoline | LPG | CNG | hybrid | |
| model year | 63 | before 1999 | 1991~1995 | 1996~2000 | 2000~2005 | 2006~2010 | 2010~2016 | others |
| air pollutant | 5 | CO | VOC | NOx | PM-10 | PM-2.5 |
| temperature | 5 | less than 0℃ | not less than 0℃ and less than 10℃ | not less than 10℃ and less than 20℃ | not less than 20℃ | |
| speed | 19 | not more than 45 km/h | not less than 45 km/h | not more than 65 km/h | not less than 65 km/h | others |
| driving distance | 6 | first section upbound | second section upbound | third section upbound | first section downbound | second section downbound | third section downbound |

- 6 vehicle types, 21 vehicle details, 5 fuels, 63 model years, 5 air pollutants, 5 temperatures, 19 speeds, and 6 driving distances
- 1,925 emission factor formulas for hot start emission

Fig. 26 definition ▶ calculates ammonia emission which is precursor of secondary fine dust
Feature ▶ As per the 2016-6 Special Fine Dust Regulations, ammonia falls in the specific harmful air pollutants
items ▶ $NH_3$ ammonia emission calculation module

| vehicle type | 6 | passenger car | van | bus | freight car | special | RV |
|---|---|---|---|---|---|---|---|
| vehicle details | 21 | minicompact/small/ medium/large | minicompact/small/ medium/large/special | bus | minicompact/small/medium/ large/special/dump truck concrete mixer | rescue/ towing/others | small/medium |
| fuel used | 5 | diesel | gasoline | LPG | CNG | hybrid | |
| model year | 17 | before 1999 | 2000~2002 | 2003~2008 | before 2009 | after 2009 | before 2010 | others |
| speed | 5 | not more than 60 km/h | not less than 60 km/h and less than 90 km/h | not less than 90 km/h | not more than 65 km/h | not less than 65 km/h | |
| driving distance | 6 | first section upbound | second section upbound | third section upbound | first section downbound | second section downbound | third section downbound |

- 6 vehicle types, 22 vehicle details, 5 fuels, 11 model years, 5 speeds, 6 driving distances
- 436 emission factor formulas for ammonia emission

DEVICE AND METHOD FOR CALCULATING AIR POLLUTANT EMISSIONS FROM ROAD MOBILE SOURCE

CROSS-REFERENCE TO RELATED APPLICATION(S)

This application claims priority to Korean Patent Application No. 10-2020-0143592 filed in the Korean Intellectual Property Office on Oct. 30, 2020 the disclosure of which is incorporated by reference herein in its entirety.

TECHNICAL FIELD

Embodiments of the disclosure relates to a device and method for calculating air pollutant emissions.

DISCUSSION OF RELATED ART

As the issue of environmental pollution emerges, various environmental technologies are being developed, a part of which is to estimate the degree of air pollution caused by vehicles.

Korean Patent Application Publication No. 10-2015-0076307 discloses a conventional technology for calculating air pollutant emissions by vehicles.

Korean Patent Application Publication No. 10-2015-0076307 discloses a technology for calculating pollutant emissions based on vehicle mileage per vehicle type and emission factor per fuel. The conventional method simplifies and calculates the emission factor for each vehicle type by averaging the per-vehicle type and per-fuel emission factors, based on the vehicle classification standard.

However, such a conventional technique simply allows for approximate calculations but is incapable of analysis of various causes of contamination or specific calculations for each contaminant.

SUMMARY

According to an embodiment, there is provided a device and method for analyzing information on driving vehicles using measuring devices installed in regional sections and calculating the pollutant emissions from the vehicles based on the analyzed information to thereby maximize the accuracy of air pollutant calculation.

According to an embodiment, there is provided a device and method for calculating air pollutant emissions that may provide specific, in-depth analysis for each emission source or cause by individually calculating the emissions for each pollutant emission source.

According to an embodiment, there is provided a device and method for calculating air pollutant emissions that may more clearly secure pollution level information for each pollutant in the air by individually calculating the emissions for each air pollutant.

The foregoing or other various embodiments of the disclosure will be apparent to one of ordinary skill in the art from the following description taken in conjunction with the accompanying drawings.

According to an embodiment, a system for calculating air pollutant emission comprises a sensor device installed in an regional section and obtaining a captured image of a vehicle passing through the regional section, an external server storing vehicle specification information, and a management server identifying the vehicle based on the captured image provided from the sensor device, obtaining the vehicle specification information for the identified vehicle from the external server, calculating air pollutant emission for each emission source using the vehicle specification information, and providing statistical information for the air pollutant emission.

The management server may include a vehicle information detection unit generating vehicle identification information for the vehicle passing through the regional section using the captured image and detecting a vehicle classification and speed information for the vehicle, an external server interworking unit obtaining the vehicle specification information from the external server, using the vehicle identification information, and an emission calculation unit setting an emission factor for each air pollutant based on the vehicle identification information provided by the vehicle information detection unit and calculating the emission for each of a plurality of emission sources using the emission factor.

The emission sources may include hot start emission, cold start emission, deterioration emission, evaporation emission, sulfur oxide emission and ammonia emission.

The management server may further include a database storing the vehicle identification information detected by the vehicle information detection unit and emission data obtained by the emission calculation unit, and an emission statistics engine generating and providing statistical data by statisticalizing the data stored in the database according to a user's setting.

The emission statistics engine may generate the statistical data by setting time series analysis, section analysis, vehicle type analysis, fuel analysis, emission type analysis, and air pollutant analysis as analysis criteria.

The emission calculation unit may include a hot start emission calculation module identifying the emission factor of the air pollutant according to a driving speed and fuel, using the vehicle specification information including a vehicle type, vehicle type details, and model year of a target vehicle from the external server, identifying a driving speed and per-section driving distance of the target vehicle, and reflecting the driving speed and the per-section driving distance to the emission factor for each air pollutant to thereby calculate the air pollutant emission in a hot start situation, a cold start emission calculation module identifying a hot-to-cold emission ratio of the target vehicle from the factor setting module based on the vehicle specification information, identifying a temperature for a section where the target vehicle is present and the per-section driving distance of the target vehicle, and reflecting the hot-to-cold emission ratio to hot start emission based on the temperature and the driving distance to thereby calculate cold start pollutant emission, and a deterioration emission calculation module identifying a deterioration factor due to a model year and warranty period for the target vehicle from the factor setting module, based on the vehicle specification information, reflecting the deterioration factor to the hot start emission to thereby calculate a deterioration emission amount of the hot start emission, and reflecting the deterioration factor to the cold start emission to thereby calculate the deterioration emission amount of the cold start emission.

The emission calculation unit may further include a sulfur oxide emission calculation module identifying the driving distance and driving speed of the vehicle using the vehicle specification information, identifying a per-fuel sulfur content for the target vehicle and a fuel consumption factor according to the driving speed, per vehicle type, and reflecting the driving speed and the driving distance to the fuel consumption factor to thereby calculate sulfur oxide emission, an evaporation emission calculation module identifying an evaporation emission factor for a gasoline vehicle from the factor setting module based on the vehicle specification information, identifying the temperature and the driving distance of the vehicle, and applying the evaporation emission factor to the driving distance and the temperature to thereby calculate evaporation emission of the gasoline vehicle, and an ammonia emission calculation module identifying an ammonia emission factor for the target vehicle from the factor setting module based on the vehicle specification information, identifying the model year and driving speed of the target vehicle, and applying the ammonia emission factor to the model year and driving speed of the target vehicle to thereby calculate ammonia emission.

According to an embodiment, a method for calculating air pollutant emission comprises obtaining a captured image for a vehicle passing through an regional section using a sensor device installed in the regional section, identifying vehicle specification information using an external server, identifying, by a management server, the vehicle based on the captured image provided from the sensor device, obtaining the vehicle specification information for the identified vehicle from the external server, calculating air pollutant emission for each emission source using the vehicle specification information, and providing statistical information for the air pollutant emission.

Providing the statistical information for the air pollutant emission may include generating, by the management server, vehicle identification information for the vehicle passing through the regional section using the captured image and detecting a vehicle classification and speed information for the vehicle, obtaining, by the management server, the vehicle specification information using the vehicle identification information, and setting, by the management server, an emission factor for each air pollutant based on the vehicle identification information and calculating the emission for each of a plurality of emission sources using the emission factor.

Calculating the emission for each of the plurality of emission sources may include identifying, by the management server, the emission factor of the air pollutant according to a vehicle type, vehicle type details, and model year of a target vehicle, based on the vehicle specification information, identifying a driving speed and per-section driving distance of the target vehicle, and reflecting the driving speed and the per-section driving distance to the emission factor for each air pollutant to thereby calculate the air pollutant emission in a hot start situation, identifying, by the management server, a hot-to-cold emission ratio of the target vehicle based on the vehicle specification information, identifying a temperature for a section where the target vehicle is present and the per-section driving distance of the target vehicle, and reflecting the hot-to-cold emission ratio to hot start emission based on the temperature and the driving distance to thereby calculate cold start pollutant emission, and identifying, by the management server, a deterioration factor due to a model year and warranty period for the target vehicle, based on the vehicle specification information, reflecting the deterioration factor to the hot start emission to thereby calculate a deterioration emission amount of the hot start emission, and reflecting the deterioration factor to the cold start emission to thereby calculate the deterioration emission amount of the cold start emission.

Calculating the emission for each of the plurality of emission sources may include identifying, by the management server, a per-fuel sulfur content for the target vehicle based on the vehicle specification information, setting a fuel consumption factor according to the driving speed, per vehicle type, based on the vehicle specification information, identifying the driving distance and driving speed of the vehicle, and reflecting the driving speed and the driving distance to the fuel consumption factor to thereby calculate sulfur oxide emission, identifying, by the management server, an evaporation emission factor for a gasoline vehicle based on the vehicle specification information, identifying the temperature and the driving distance of the vehicle, and applying the evaporation emission factor to the driving distance and the temperature to thereby calculate evaporation emission of the gasoline vehicle, and identifying, by the management server, an ammonia emission factor for the target vehicle based on the vehicle specification information, identifying the model year and driving speed of the target vehicle, and applying the ammonia emission factor to the model year and driving speed of the target vehicle to thereby calculate ammonia emission.

According to various embodiments, the device and method for calculating air pollutant emissions may provide specific, in-depth analysis for each emission source or cause by individually calculating the emissions for each pollutant emission source.

According to various embodiments, the device and method for calculating air pollutant emissions may provide specific, in-depth analysis for each emission source or cause by individually calculating the emissions for each pollutant emission source.

According to various embodiments, the device and method for calculating air pollutant emissions may more clearly secure pollution level information for each pollutant in the air by individually calculating the emissions for each air pollutant.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 13 is a flowchart illustrating a method for calculating air pollutant emissions according to an embodiment;

FIGS. 20, 21, 22, 23, 24, 25, and 26 are views illustrating an operation example of a management server according to an embodiment.

DETAILED DESCRIPTION

Figure 1:
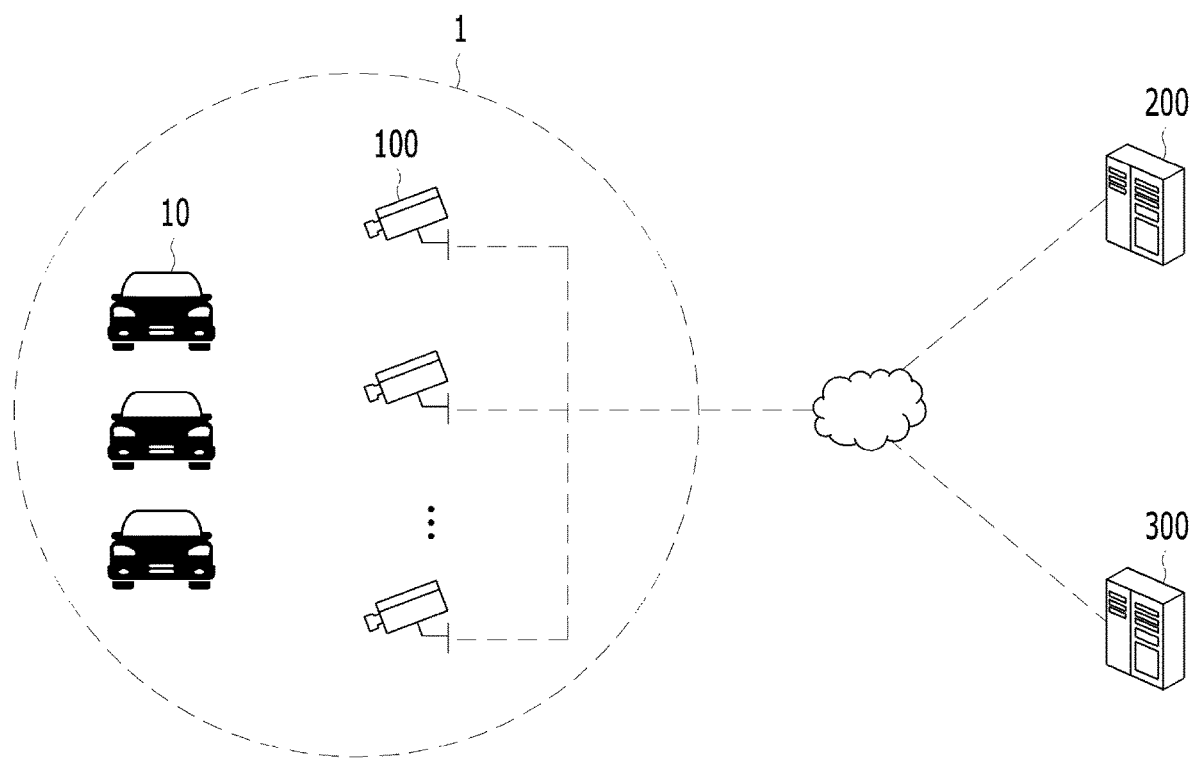
FIG. 1 is a view illustrating a system for calculating air pollutant emissions according to an embodiment.

Hereinafter, exemplary embodiments of the disclosure are described in detail with reference to the accompanying drawings.

However, the embodiments of the disclosure may be modified into various other forms, and the scope of the disclosure is not limited to the embodiments described below. In addition, embodiments of the disclosure are provided in order to more completely explain the disclosure to one of ordinary skill in the art.

The foregoing objectives, features, and advantages are described below in detail with reference to the accompanying drawings so that the technical spirit of the disclosure may easily be achieved by one of ordinary skill in the art to which the invention pertains. When determined to make the subject matter of the disclosure unclear, the detailed description of the known art or functions may be skipped. Hereinafter, preferred embodiments of the disclosure are described in detail with reference to the accompanying drawings. The same reference denotations are used to refer to the same or similar elements throughout the drawings.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

In addition, various components and sub-components thereof are described below in order to describe the system according to the disclosure. These components and their sub-components may be implemented in various forms such as hardware, software, or a combination thereof. For example, each element may be implemented as an electronic component for performing its corresponding function, or may be implemented as software itself that may be driven in an electronic system, or as a functional element of such software. Each element may be implemented as an electronic component and driving software corresponding thereto.

Various schemes or methods described herein may be implemented in hardware, software, or a combination thereof. As used herein, the terms "unit", "server" and "system" may be interpreted or treated as equivalent to a computer-related entity, e.g., hardware, software, or a combination of hardware and software. Each function executed in the system of the disclosure may be configured as a module unit and may be recorded in one physical memory or be distributed and recorded between two or more memories and recording media.

Each unit or module as used herein may be implemented as a circuit or circuitry to implement the functions or operations thereof described below in detail.

Various example flowcharts have been disclosed herein, but these flowcharts are provided for convenience of description of each step, and the steps in each flowchart are not necessarily performed according to the order of the flowchart. For example, the steps in the flowchart may be performed simultaneously or in the order shown in the flowchart, or in an order opposite to that shown in the flowchart.

Hereinafter, a system and method for calculating air pollutant emissions according to some embodiments of the disclosure are described in detail with reference to the accompanying drawings.

FIG. 1 is a view illustrating a system for calculating air pollutant emissions according to an embodiment.

Referring to FIG. 1, a system for calculating air pollutant emissions may acquire captured images of vehicles 10 passing through a corresponding regional section by using sensor devices 100 installed in a regional section 1.

The sensor device 100 may include a camera device, and may use the camera device to obtain captured images of vehicles passing through the regional section. Using the acquired captured images, a management server 200 may identify the numbers (e.g., plate numbers) of the vehicles and obtain vehicle information.

According to an embodiment, the sensor device 100 may further include a temperature sensor. The sensor device 100 may provide the collected or gathered sensing data or information to the management server 200. The management server 200 may identify each vehicle passing through the regional section based on the sensing data and may obtain specification information for the identified vehicles. The management server 200 may calculate air pollutant emissions for each emission source or cause by using the obtained specification information, build a database using the calculated air pollutant emissions, and provide statistical information on air pollutant emissions.

To obtain the specification information on the vehicle, the management server 200 may obtain the specification information on the identified vehicle by interworking with an external server 300. As an example of the external server 300, the Korea Transportation Safety Authority server may be used. The management server 200 may send a request for the specification information on the vehicle to the external server 300 based on (or using) the identified vehicle information (e.g., vehicle number) to the external server. The requested vehicle specification information may include the vehicle type, model year, fuel, and other specifications (e.g., total vehicle weight and total displacement).

Figure 2:
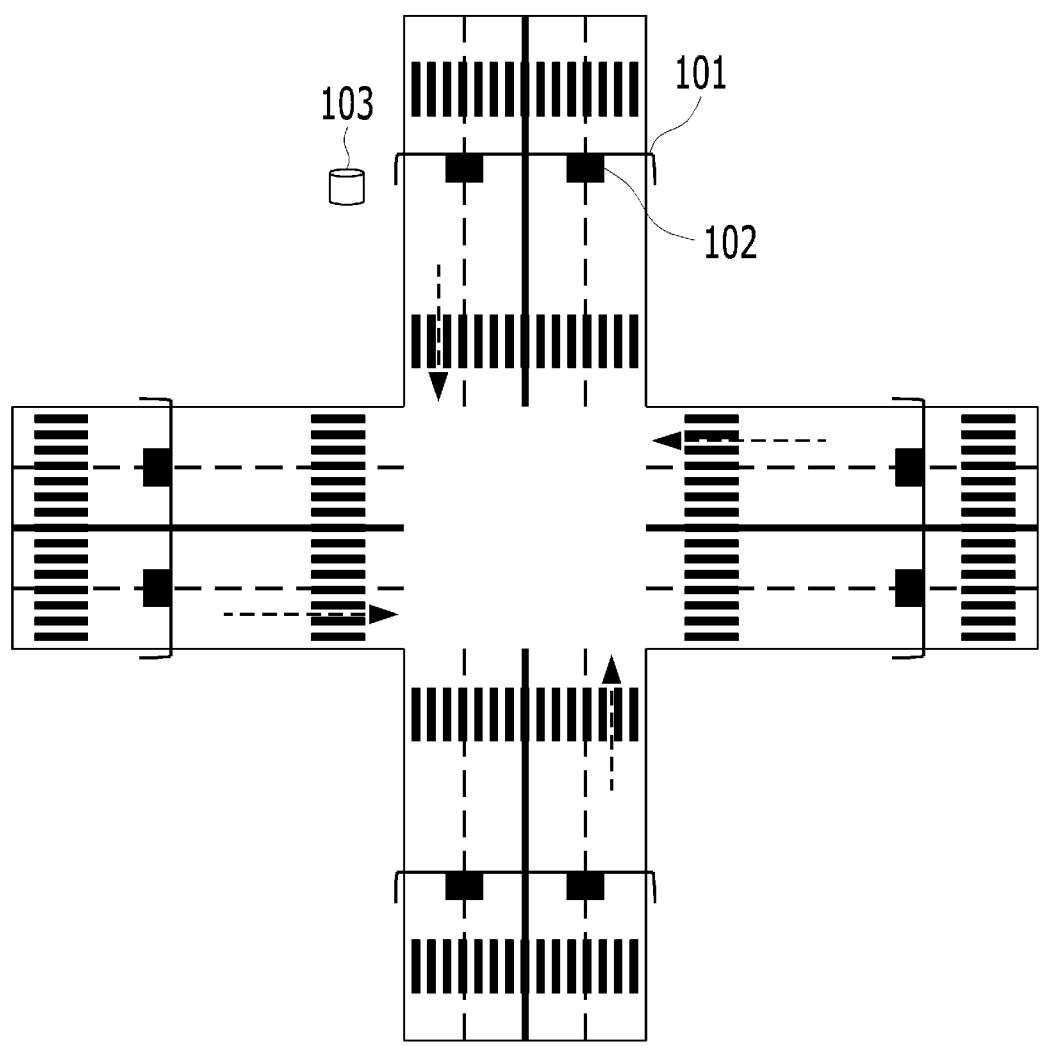
FIGS. 2 and 3 are views illustrating examples of deployment of sensor devices as shown in FIG. 1, according to an embodiment.
Figure 3:
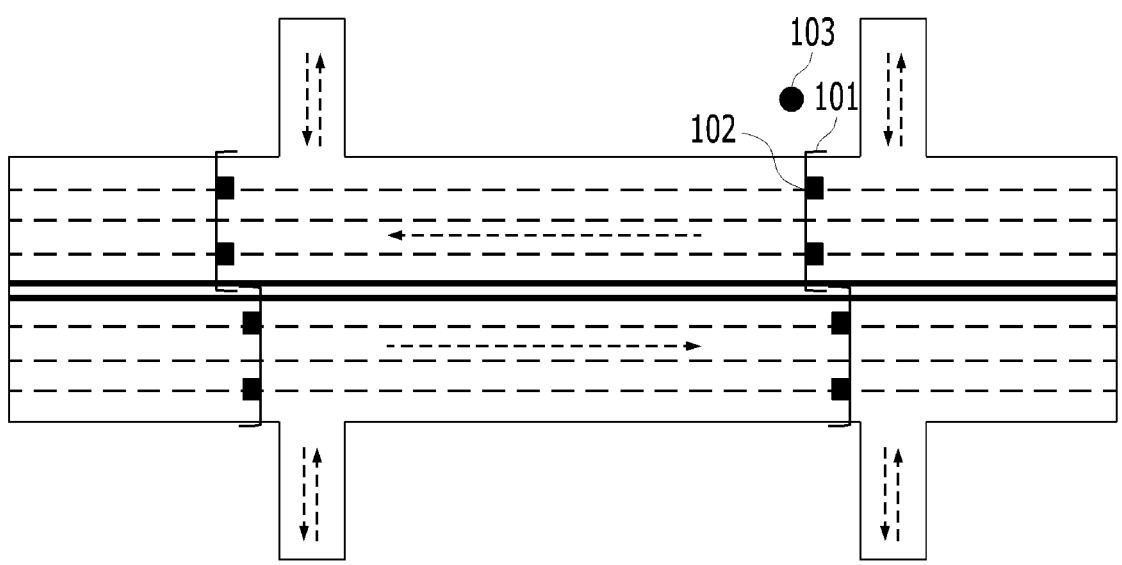

FIGS. 2 and 3 are views illustrating examples of deployment of sensor devices as shown in FIG. 1, according to an embodiment.

FIG. 2 shows sensor devices installed at an intersection. The sensor device may include a camera 102 installed on an overhead road structure 101. For example, targeting all the roads crossing the intersection, each camera 102 may be installed on every few lanes (e.g., every two or three lanes) so that they face in opposite directions, thereby obtaining images for the vehicles passing through the intersection.

The sensor device may further include a temperature sensor 103, and the temperature sensor 103 may collect or gather current temperature data and provide the current temperature data to the management server 200. The current temperature data may be used to calculate evaporation emissions which are described below.

FIG. 3 shows sensor devices installed on a straight road. The sensor device may include a camera 102 installed on an overhead road structure 101. For example, overhead road structures 101 may be deployed where branch roads merge to the straight road, and each camera may be installed on every few road lanes to obtain images for the vehicles travelling on the straight road.

The sensor device may further include a temperature sensor 103. This is described below with reference to FIG. 2.

Figure 4:
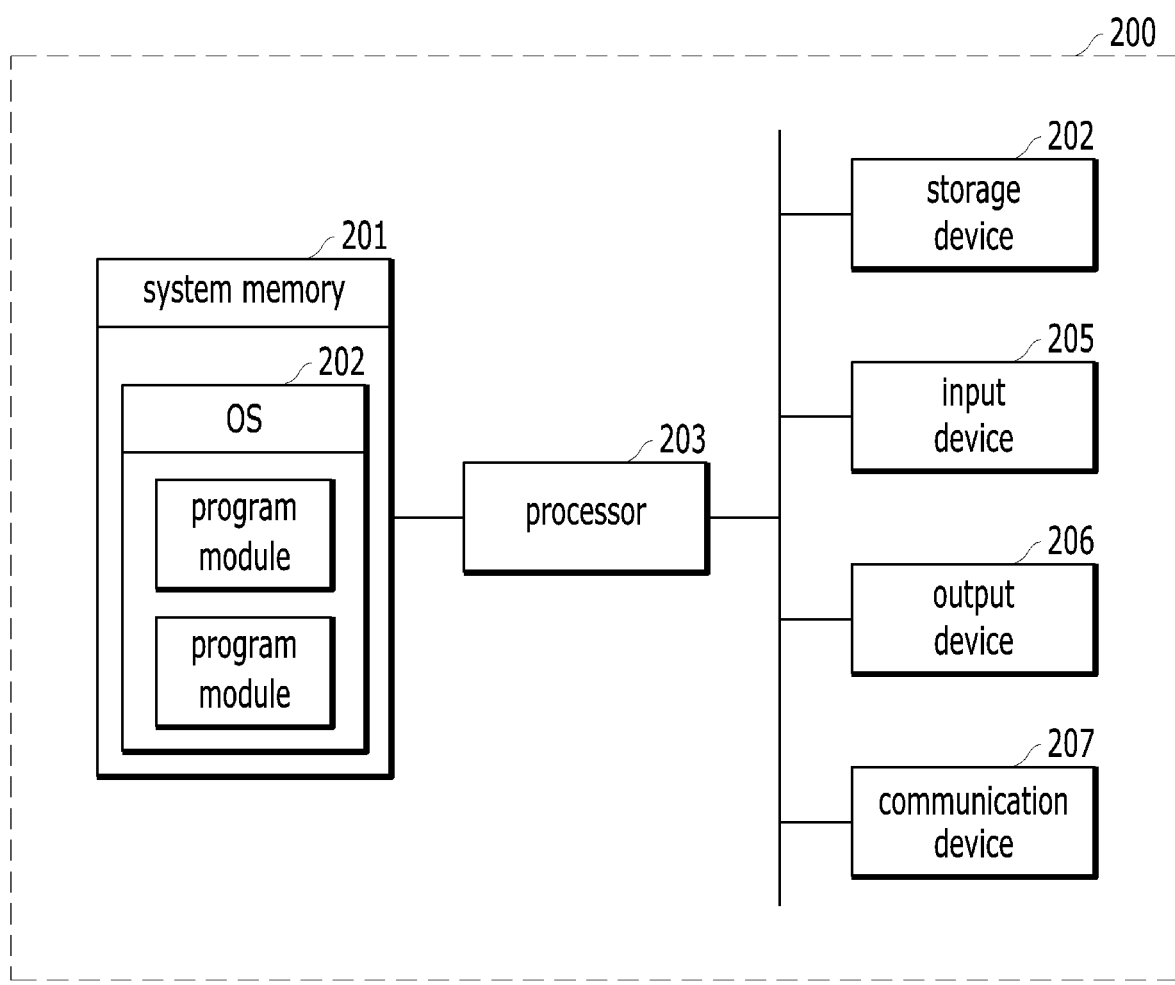
FIG. 4 is a view illustrating a computing operation environment of a management server according to an embodiment.

FIG. 4 is a view illustrating a computing operation environment of a management server according to an embodiment.

FIG. 4 is intended to provide a general description of a suitable computing environment where embodiments of the management server may be implemented. FIG. 4 illustrates a configuration of an example computing operation environment for configuring the management server.

The computing device 200 may be any computing device that may executes an application for providing a gallery of pre-built controls for a logic scenario in a database program according to embodiments. The computing device 200 may include, at least, a processor 203 and a system memory 201. The computing device 200 may include a plurality of processors that may cooperate when executing a program. Depending on the exact configuration and type of the computing device, the system memory 201 may be, or include, a volatile memory (e.g., random access memory (RAM)), a non-volatile memory (e.g., read-only memory *(ROM) or flash memory), or a combination thereof. The system memory 201 may include an operating system (OS) 202 suitable for controlling the operation of the platform, such as, e.g., a Windows™ from Microsoft. The system memory 201 may also include one or more software applications such as program modules and applications.

The computing device 200 may have additional features or functions. For example, the computing device 200 may include an additional data storage device 204 such as a magnetic disk, an optical disk, or tape. Such additional data storage device may be a mobile storage device and/or a fixed (or stationary) storage device. The storage device or computer storage medium may include a volatile and/or non-volatile and/or mobile and/or stationary storage or recording medium that may be implemented in any method or scheme to store computer-readable instructions, data architecture, program modules, or other data or information. Both the system memory 201 and the storage device 204 may be mere examples of computer-readable storage media. Computer-readable storage media may include, but are not limited to, RAM, ROM, EEPROM, flash memory or other various memories, CD-ROM, DVD or other optical storage, magnetic tape, magnetic disk storage or other magnetic storage devices, or any other media that may store desired information or data and be accessed by the computing device 200.

The computing device 200 may include an input device 205, such as a keyboard, a mouse, a pen, a voice input device, a touch input device, and a comparable input device. The output device 206 may include, e.g., a display, a speaker, a printer, and other various types of output devices. Since these devices are known in the art, no detailed description thereof is given.

The computing device 200 may include a communication device 207 that allows a device to communicate with other devices via wired and wireless networks, satellite links, cellular links, local area networks, and comparable mechanisms in a distributed computing environment. The communication device 207 is a mere example communication medium, and the communication medium may store or include computer-readable instructions, data structures, program modules, or other data therein. By way of example, the communication medium may include, but is not limited to, a wired medium such as a wired network or a direct wired connection, and a wireless medium such as acoustic, radio frequency (RF), infrared (IR), and other wireless medium.

Figure 5:
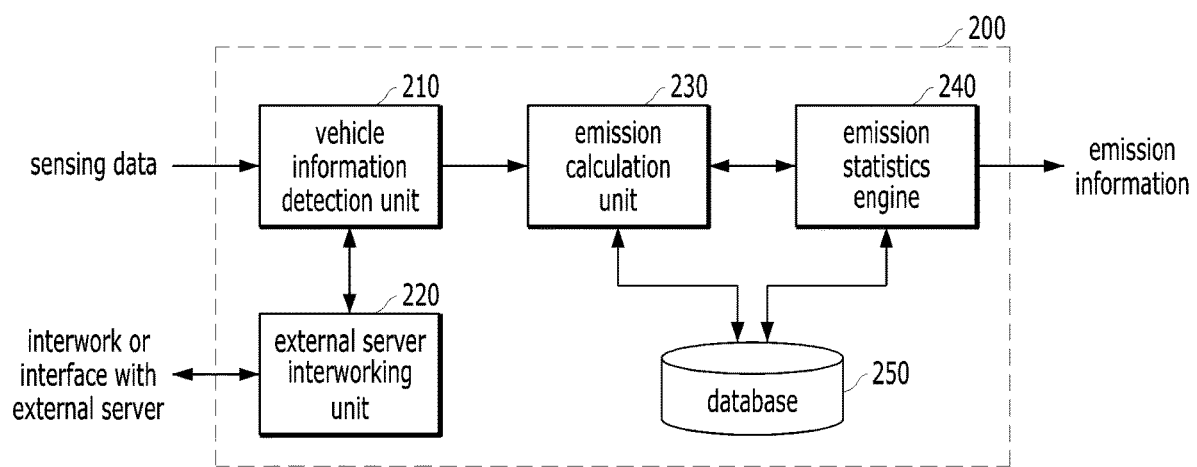
FIG. 5 is a block diagram illustrating a configuration of a management server according to an embodiment.

FIG. 5 is a block diagram illustrating a configuration of a management server according to an embodiment.

Referring to FIG. 5, the management server 200 may include a vehicle information detection unit 210, an external server interworking unit 220, an emission calculation unit 230, an emission statistics engine 240 and a database 250.

The vehicle information detection unit 210 may identify each of the vehicles passing through an regional section using the captured images provided from the sensor device and generate vehicle identification information. For example, the vehicle information detection unit 210 may identify the vehicle number (e.g., plate number) of each vehicle based on a vehicle plate recognition technology using an image analysis algorithm.

According to an embodiment, the vehicle information detection unit 210 may acquire speed information of each vehicle. For example, the sensor device may include a speed sensor that operates in association with a camera, and the vehicle information detection unit 210 may obtain speed information for each vehicle by associating or linking the captured image and speed information provided from the sensor device. As another example, the vehicle information detection unit 210 may calculate the speed of the vehicle by calculating the moving distance of each vehicle based on the captured images taken at regular time intervals or every predetermined time intervals.

According to an embodiment, the vehicle information detection unit 210 may set driving distance information of the vehicle. The vehicle information detection unit 210 may set the driving distance information of the vehicle by setting the distance between the cameras as the driving distance. For example, when a first camera and a second camera are provided at a 1 Km interval, the vehicle information detection unit 210 may set the driving distance information of the vehicle captured by the second camera to 1 Km.

According to an embodiment, the vehicle information detection unit 210 may identify each vehicle and differentiate them from one another. For example, the vehicle information detection unit 210 may identify, differentiate, or classify each vehicle as a passenger car, a van, an RV, a freight car, a special car, or a bus based on the external feature points of the vehicle in the captured image.

The external server interworking unit 220 may interwork with, or interface with, the external server 300 to obtain specification information for the vehicle. The external server interworking unit 220 may be an interface with an external server. For example, the vehicle information detection unit 210 may generate vehicle identification information by identifying the vehicle number (e.g. plate number) of each vehicle passing through an regional section and provide the vehicle identification information to the external server interworking unit 220. The external server interworking unit 220 may send a request for specification information for a corresponding vehicle to the external server 300 based on the vehicle identification information, obtain the vehicle specification information from the external server 300, and provide the obtained vehicle specification information to the vehicle information detection unit 210.

The specification information may include vehicle type, model year, fuel, and specifications (total vehicle weight and total displacement). For example, the specification information may include information such as vehicle name, total displacement, rider capacity, maximum load capacity, total vehicle weight, purpose, and type on the vehicle specification table.

The vehicle information detection unit 210 may identify vehicles or differentiate between vehicles using the specification information. For example, the vehicle information detection unit 210 may use the specification information to classify the vehicle as a passenger vehicle (minicompact, small, medium, or large), a van (minicompact, small, medium, large, or special), a bus, a freight vehicle (minicompact, small, medium, large, dump truck, or concrete mixer), a special vehicle (rescue vehicle, tow vehicle, or others), and a recreational vehicle (RV) (small or medium).

The vehicle information detection unit 210 may provide the detected vehicle information and the specification information for each vehicle to the emission calculation unit 230. The results of the classification may be used when the emission calculation unit 2320 calculates hot start emissions, deterioration emissions, sulfur oxide emissions, and ammonia emissions.

The vehicle information detection unit 210 is described in more detail below with reference to FIG. 6.

The emission calculation unit 230 may set an emission factor for each air pollutant based on the vehicle information provided by the vehicle information detection unit 210 and calculate emission for each of a plurality of emission sources using the emission factors.

The emission calculation unit 230 may calculate each of hot start emission, cold start emission, deterioration emission, evaporation emission, sulfur oxide emission, and ammonia emission as emission sources.

The emission calculation unit 230 may store the vehicle information and data calculated or obtained using the vehicle information in the database 250.

The emission calculation unit 230 is described in more detail below with reference to FIG. 7.

The database 250 may store vehicle information detected or obtained by the vehicle information detection unit 210 and emission data calculated or obtained by the emission calculation unit 230.

The emission statistics engine 240 may generate and provide statistical data by statisticalizing the data stored in the database 250 according to a user's settings.

Figure 8:
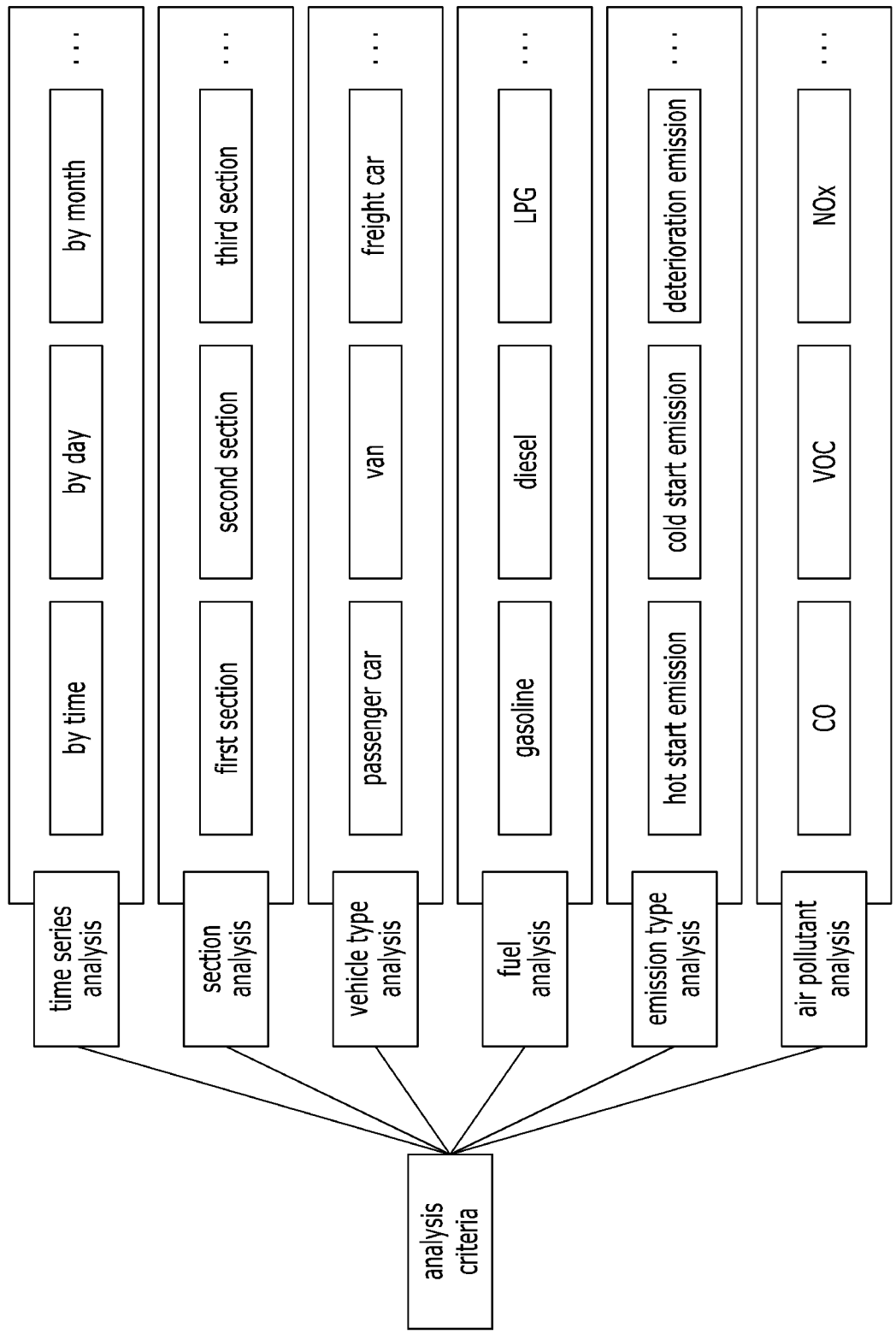
FIG. 8 is a view illustrating analysis criteria of a management server according to an embodiment.

The emission statistics engine 240 may generate the statistical data, with the data classified based on a plurality of analysis criteria. FIG. 8 is a view illustrating analysis criteria of a management server according to an embodiment.

Referring to FIG. 8, the emission statistics engine 240 may generate the statistical data by setting time series analysis, section analysis, vehicle type analysis, fuel analysis, emission type analysis, and air pollutant analysis as the analysis criteria.

The time series analysis sets time series criteria by time, day of the week, month, or period. The emission statistics engine 240 may generate statistics by selecting data suitable for the set criteria.

The section analysis is to perform analysis, with regional sections differentiated from one another. There may be a plurality of regional sections differentiated from one another, and when at least some of the plurality of regional sections are selected, the emission statistics engine 240 may select data for the regional sections and generate statistics.

The vehicle type analysis is to classify vehicles by type, for example, as passenger cars, vans, RVs, freight cars, special vehicles, or buses. The emission statistics engine 240 may select data for a selected type of vehicles and generate statistics.

The fuel analysis may be to classify vehicles according to fuels they use, e.g., as gasoline, diesel, LPG, CNG, hybrid, electricity, or hydrogen vehicles. The emission statistics engine 240 may select data for the vehicles using the selected kind or type of fuel and generate statistics.

The emission type analysis is to classify emission sources or causes, such as, e.g., hot start emission, cold start emission, deterioration emission, evaporation emission, sulfur oxide emission and ammonia emission. The emission statistics engine 240 may select data for a selected emission source and generate statistics.

The air pollutant analysis is to classify air pollutants, such as, e.g., CO, VOC, NOx, PM10, PM2.5, SOx, and NH3. The emission statistics engine 240 may select data for the selected air pollutant and generate statistics.

Figure 9:
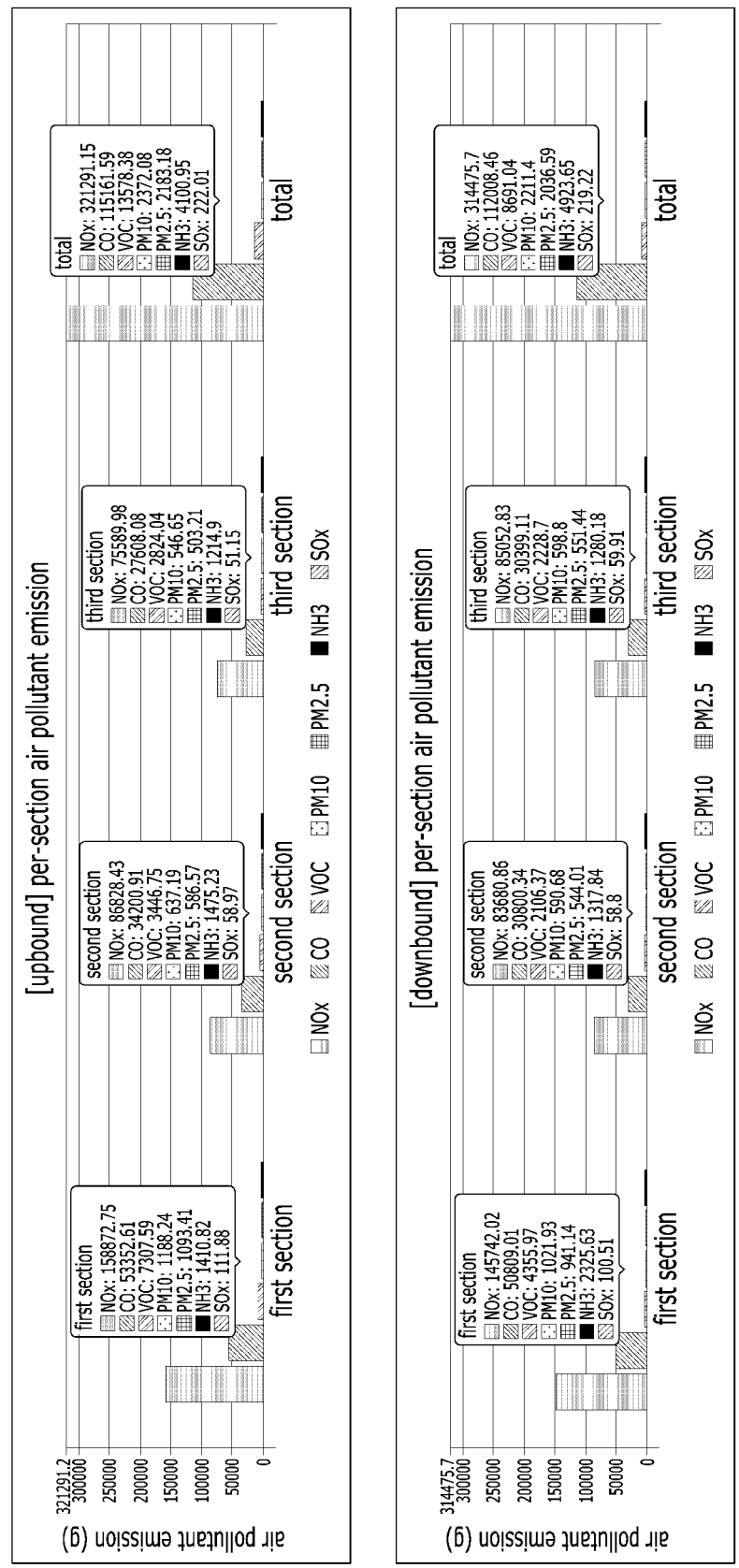
FIGS. 9, 10, and 11 are graphs illustrating statistics provided and displayed by a management server according to an embodiment.
Figure 10:
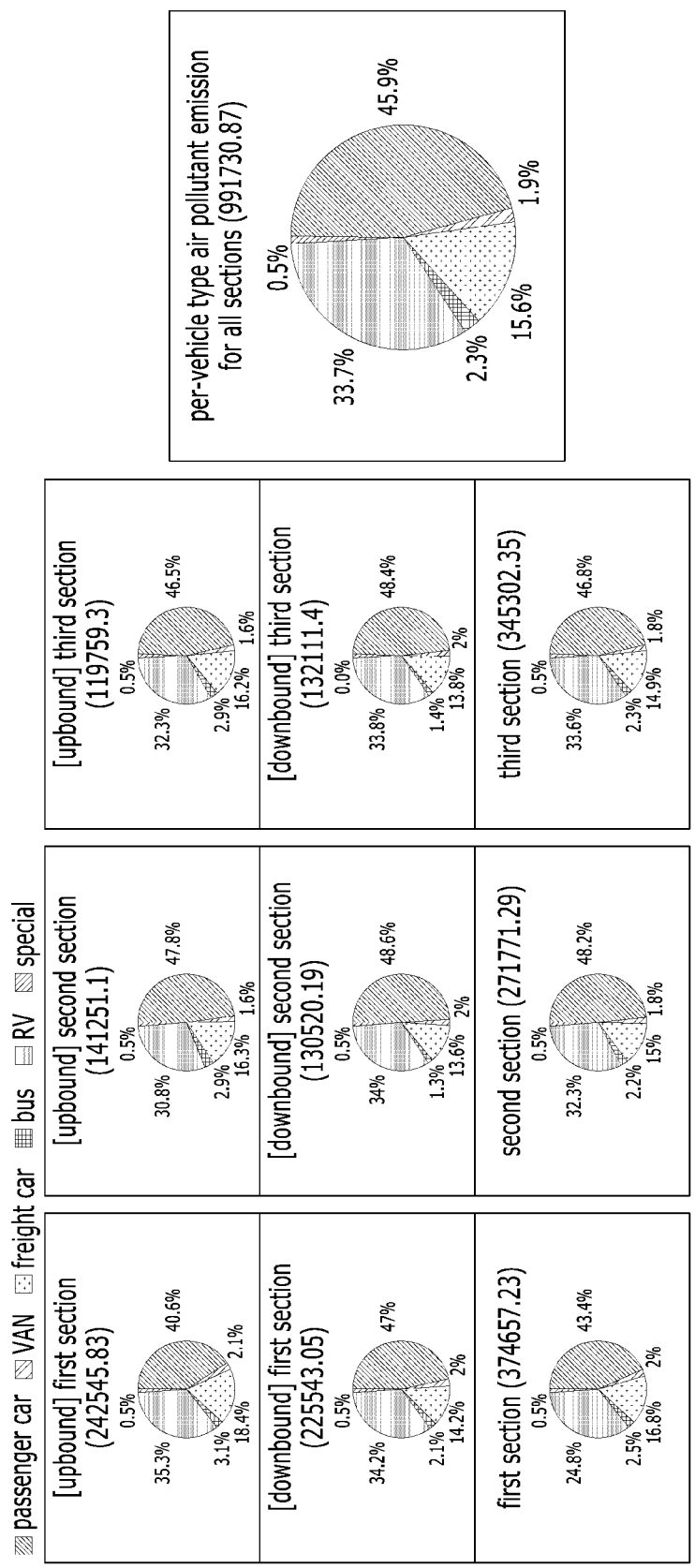
Figure 11:
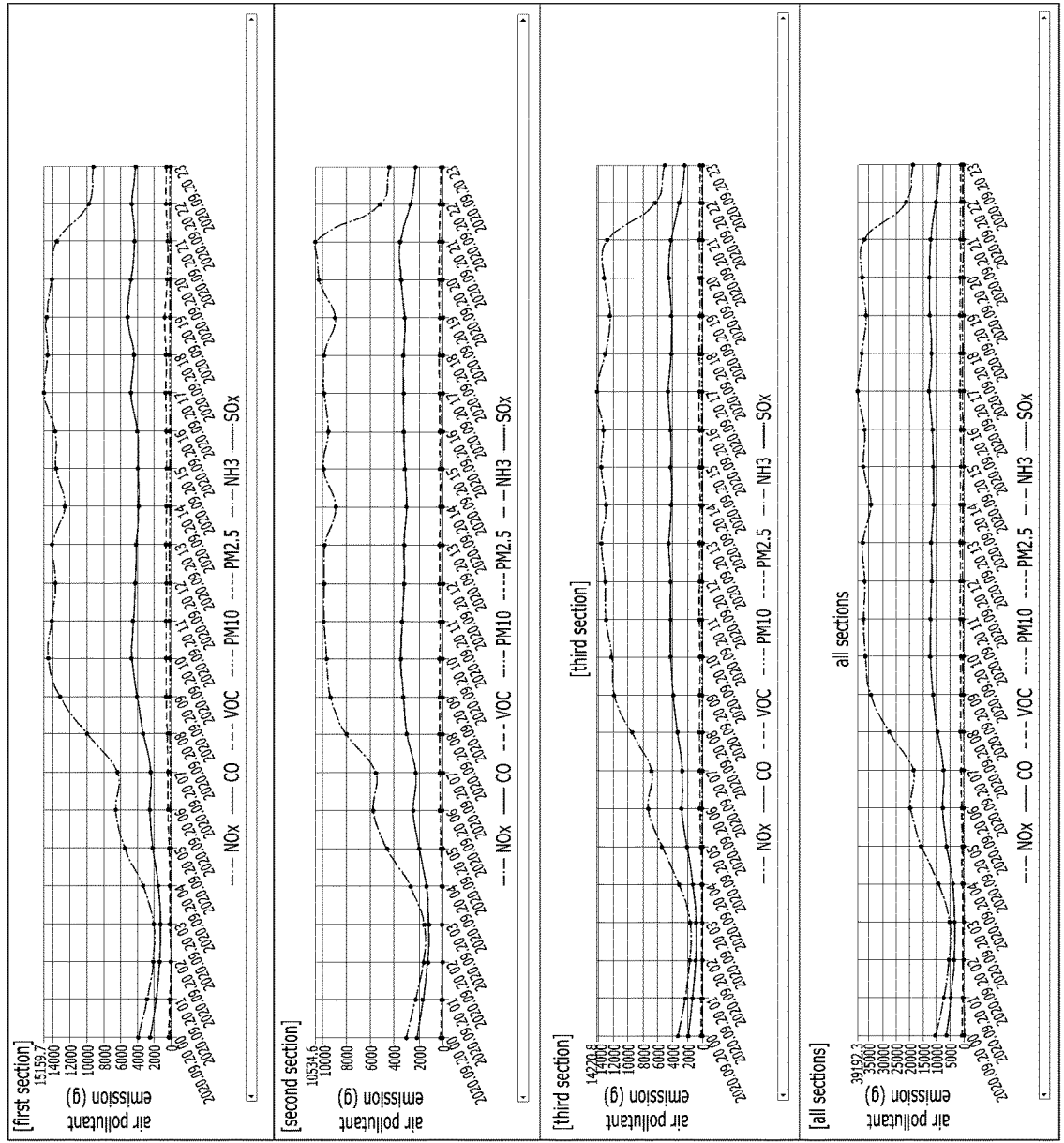

FIGS. 9 to 11 are views illustrating examples of statistics provided or displayed by a management server according to an embodiment of the disclosure. Examples of statistics, or statistical information or data, obtained by the emission statistics engine 240 are described below in detail with reference to FIGS. 9 to 11.

FIG. 9 is a graph showing statistical data for each regional section and for each air pollutant, and FIG. 10 is a graph showing statistical data for each air pollutant, for each vehicle type, and for each fuel type. FIG. 11 is a graph showing statistical data for each time and for each air pollutant.

The emission statistics engine 240 may apply a plurality of analysis criteria, thereby providing various statistical data.

Figure 6:
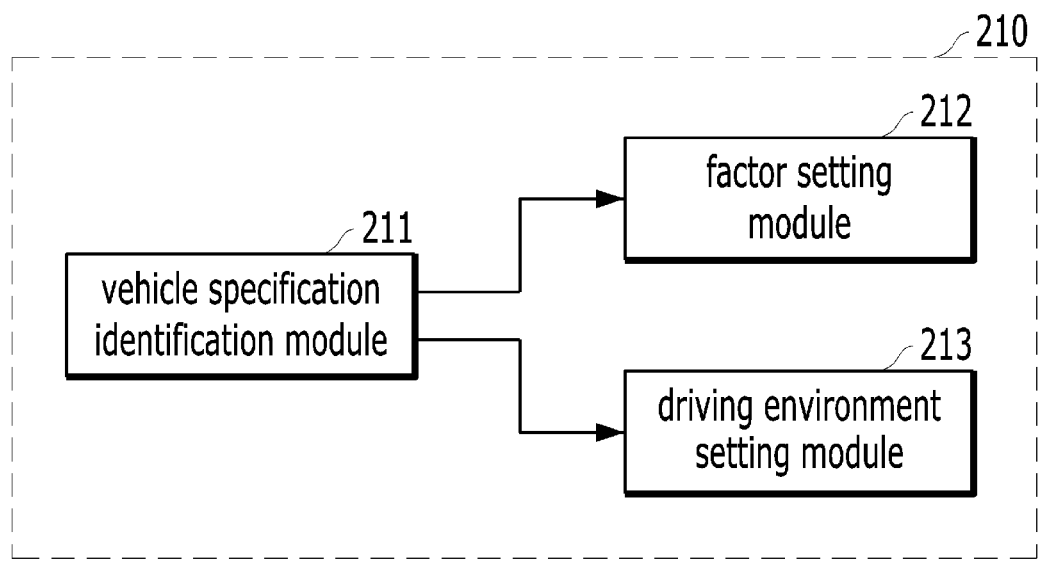
FIG. 6 is a block diagram illustrating a configuration of vehicle information detection unit as shown in FIG. 5, according to an embodiment.

FIG. 6 is a block diagram illustrating a configuration of vehicle information detection unit as shown in FIG. 5, according to an embodiment.

Referring to FIG. 6, the vehicle information detection unit 210 may include a vehicle specification identification module 211, a factor setting module 212, and a driving environment setting module 213.

The vehicle specification identification module 211 may identify each vehicle passing through a region section based on the captured image and obtain specification information for each identified vehicle from an external server.

For example, the specification information may include the vehicle type, vehicle type details, and model year of a target vehicle and, according to an embodiment, the specification information may further include information such as fuel used.

The vehicle type is a major classification for vehicle types, and may be classified into, for example, passenger, van, bus, cargo, special, and RV. The vehicle type details are detailed classifications for vehicle types and may be classified into, for example, minicompact, small, medium, large, and special for each vehicle type, and special vehicle types may be divided into rescue, towing, and others.

The factor setting module 212 may set factors necessary for calculating emission, such as an emission factor, a deterioration factor, and a fuel consumption factor. For example, the factor setting module 212 may set a fuel consumption factor according to the driving speed for each vehicle type, a sulfur content of each vehicle fuel, an ammonia emission factor of the vehicle, a hot-to-cold emission ratio of the vehicle, a deterioration factor according to the model year and warranty period of the vehicle, a sulfur content for each vehicle fuel, an evaporation emission factor for the gasoline vehicle, and an ammonia emission factor of the vehicle. To this end, the factor setting module 212 may store information related to each factor or may receive or collect the factor-related information from an external server having the factor-related information and manage the factor-related information.

The driving environment setting module 213 may calculate a driving speed and a driving distance for each vehicle. The driving environment setting module 213 may calculate the driving speed of the vehicle passing through each regional section and identify the movement of the vehicle in a plurality of regional sections to thereby calculate the driving distance.

Figure 7:
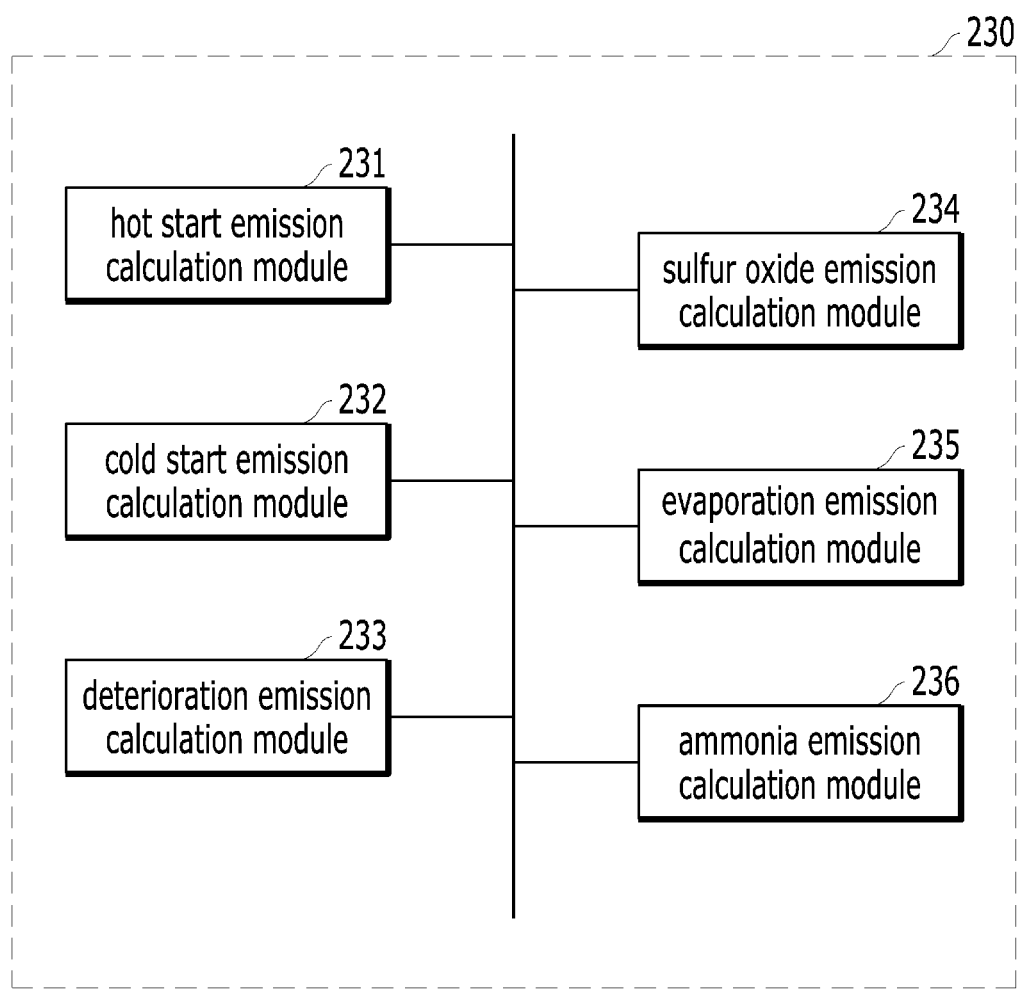
FIG. 7 is a block diagram illustrating a configuration of an emission calculation unit as shown in FIG. 5, according to an embodiment.

FIG. 7 is a block diagram illustrating a configuration of the emission calculation unit shown in FIG. 5, and the emission calculation unit is described below in more detail below with reference to FIG. 7.

Referring to FIG. 7, the emission calculation unit 230 may include a hot start emission calculation module 231, a cold start emission calculation module 232, a deterioration emission calculation module 233, a sulfur oxide emission calculation module 234, an evaporation emission calculation module 235 and an ammonia emission calculation module 236.

Figure 20:
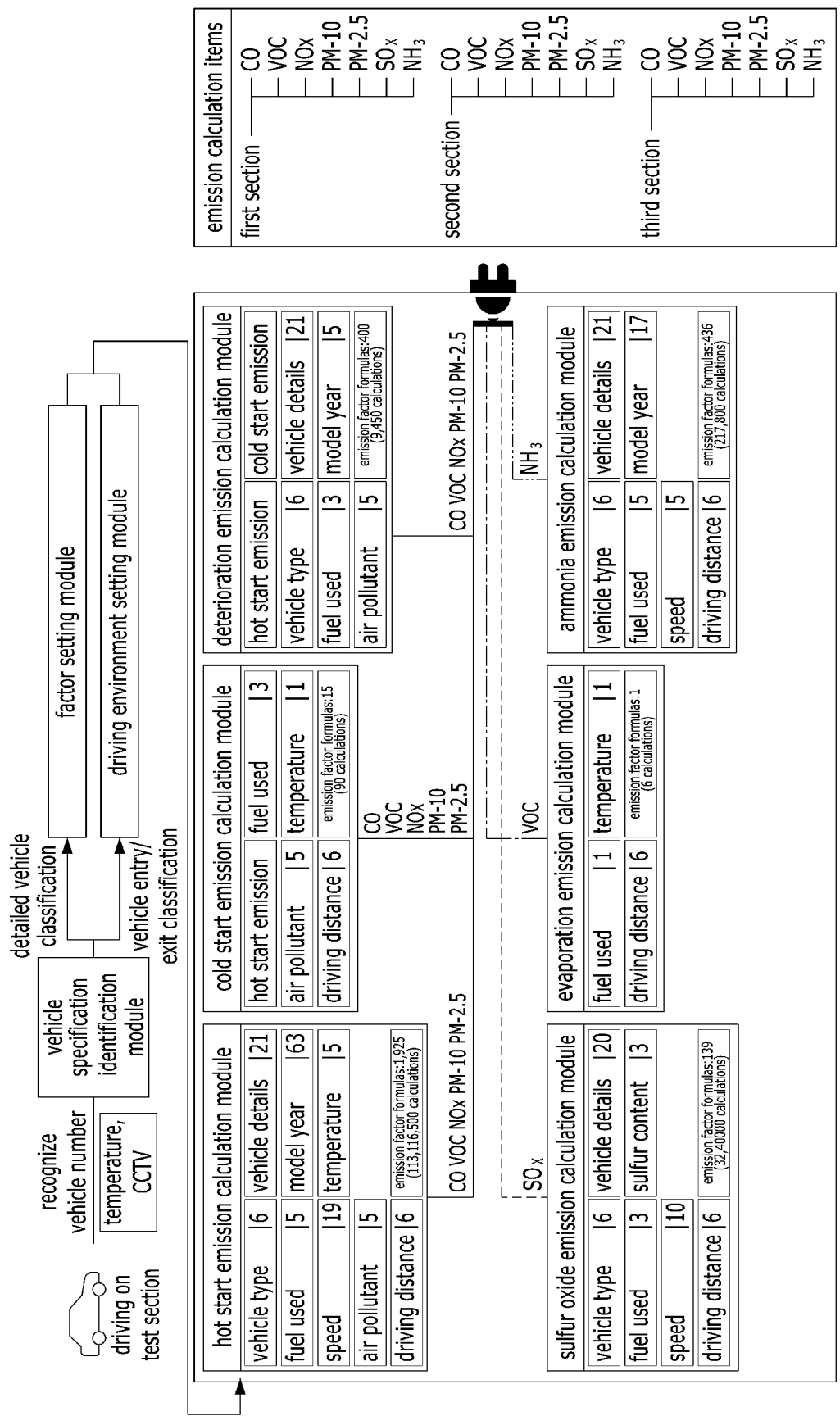

FIG. 20 shows an example of application of the vehicle information detection unit 210 and the emission calculation unit 230, and FIGS. 21 to 26 illustrate an application example of each module of the emission calculation unit. Embodiments of the disclosure are described below further with reference to FIGS. 20 and 26.

The hot start emission calculation module 231 calculates emission of pollutants discharged while the automobile engine is preheated, by summing the pollutant emissions by vehicle type, the pollutant emissions by emission regulation year, and the pollutant emissions by pollutant type, based on Equation 1 below.

$$ERHOTij = \Sigma(EHOTijm \times VKTj \times Njm) \times \text{driving speed} \times \text{driving distance} \quad \text{[Equation 1]}$$

Here, ERHOTij is the hot-start emissions (g) in the regional section by pollutant (i) and by target vehicle (j), and EHOTijm is the emission factor (g/km) by pollutant (i), by target vehicle (j), and by emission regulation year (m).

Figure 14:
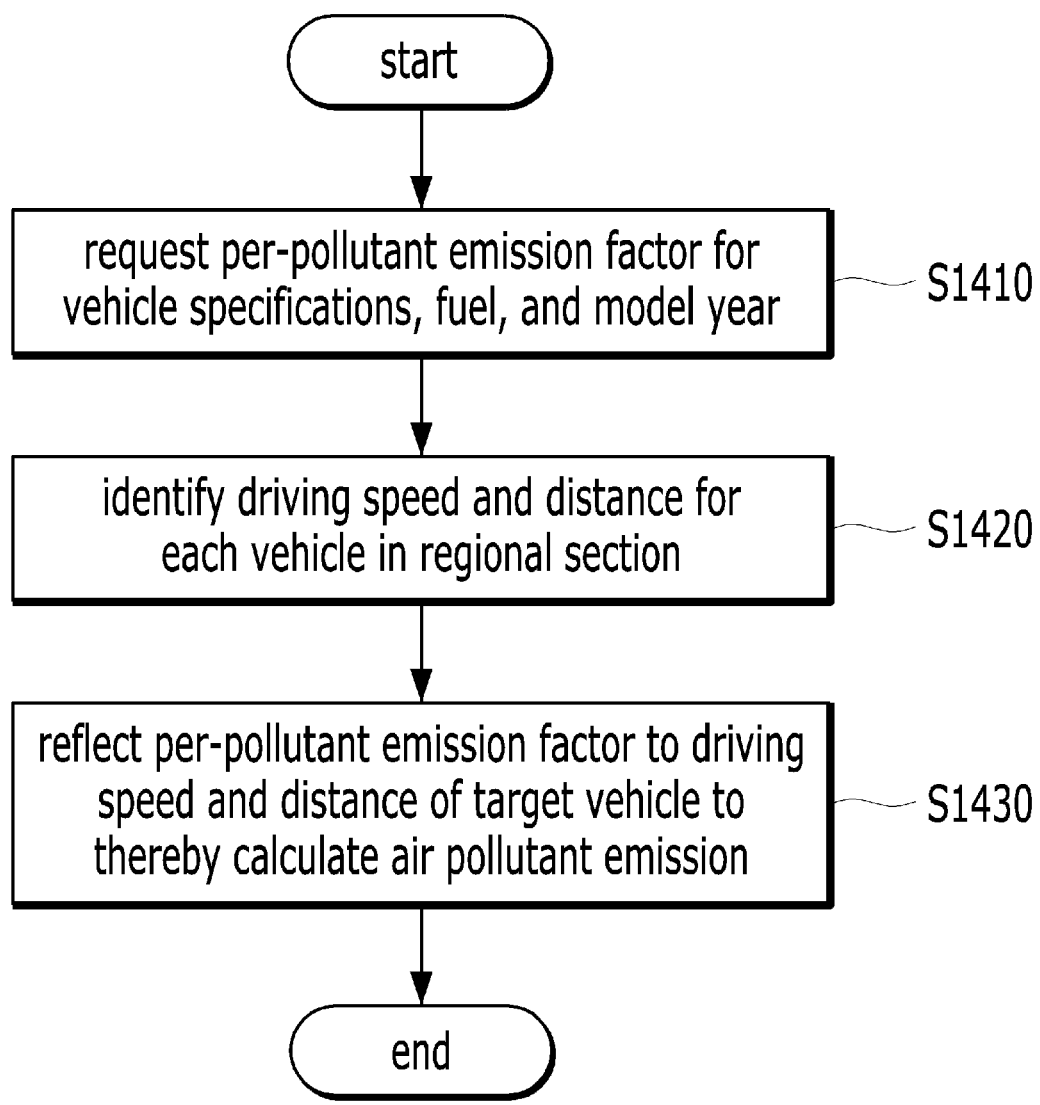
FIG. 14 is a flowchart illustrating an example of calculating hot start emissions according to an embodiment.

FIG. 14 is a flowchart illustrating an example of calculating hot start emissions according to an embodiment of the disclosure.

The hot start emission calculation module 231 identifies whether it is possible to obtain information on the emission factor for the vehicle based on the specification information for the vehicle. For example, the hot start emission calculation module 231 may identify the emission factor of pollutants according to the vehicle type, vehicle type details, model year, driving speed and fuel of the vehicle, from the factor setting module 212, based on the specification information of the vehicle (S1410).

Thereafter, the hot start emission calculation module 231 may identify the driving speed of the target vehicle and the driving distance for each section (S1420) and reflect the driving speed and driving distance to the emission factor for each pollutant, e.g., CO, VOC, NOx, PM10, and PM2.5, thereby calculating the pollutant emission amount in the hot start situation (S1430).

In the example shown in FIG. 21, the hot start emission calculation module 231 may calculates the hot start emission based on each vehicle type, vehicle type details, fuel used, model year, air pollutants, temperature, speed and driving distance (e.g., mileage).

The cold start emission calculation module 232 may calculate the pollutant emission amount in the cold start situation based on the pollutant emission amount calculated by the hot start emission calculation module 231.

Figure 15:
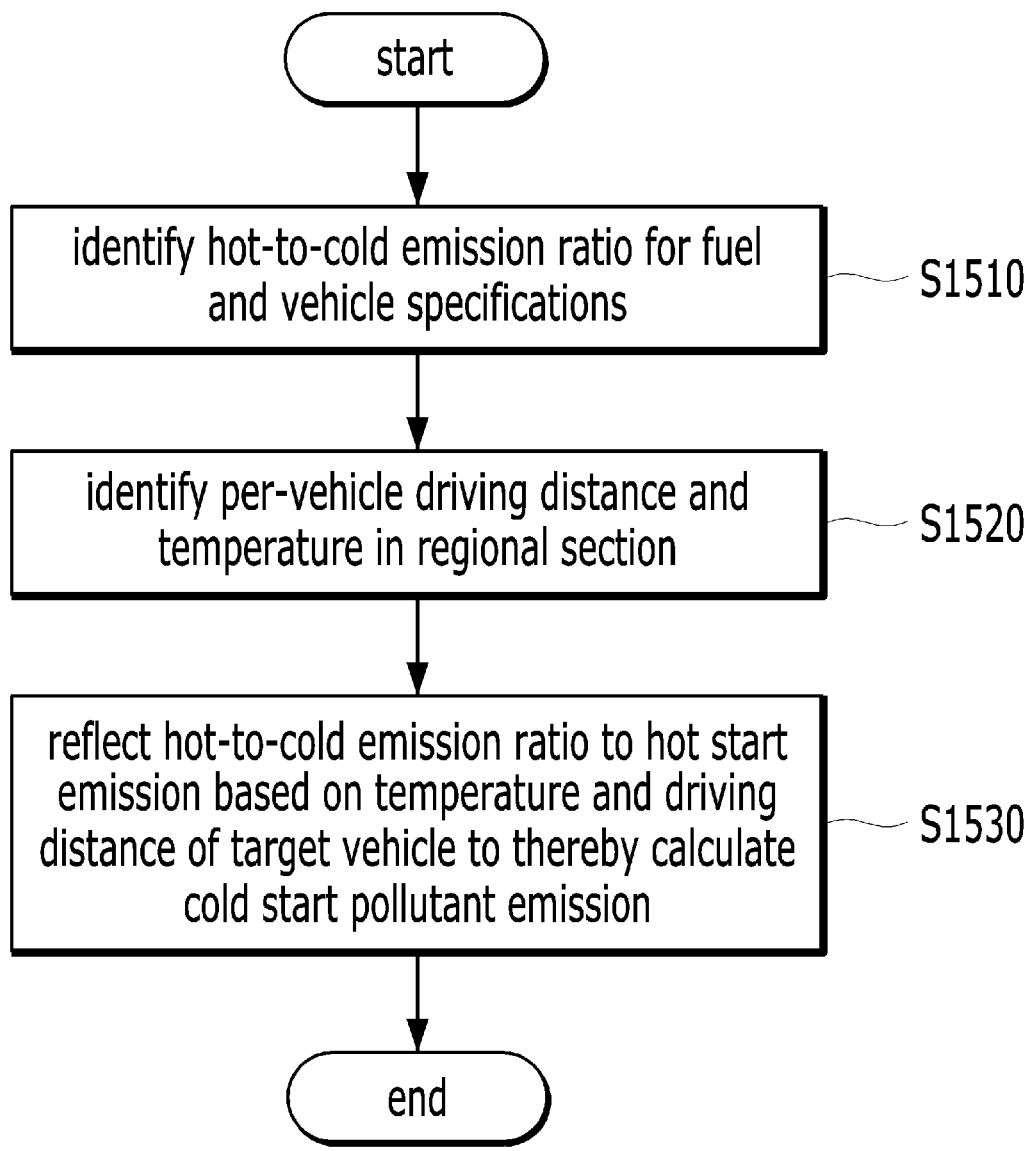
FIG. 15 is a flowchart illustrating an example of calculating cold start emissions according to an embodiment.

FIG. 15 is a flowchart illustrating an example of calculating cold start emissions according to an embodiment of the disclosure.

The cold start emission calculation module 232 may identify the ratio of hot emission to cold emission of the vehicle from the factor setting module 212 based on the vehicle specification information (S1510). Here, the hot-to-cold emission ratio may vary depending on the temperature.

Therefore, the cold start emission calculation module 232 may identify the temperature of the section in which the target vehicle is present and identify the driving distance (e.g., the mileage) for each section of the target vehicle (S1520).

Thereafter, the cold start emission calculation module 232 may calculate the emission of cold start pollutants by reflecting the hot-to-cold emission ratio to the hot starting emission amount based on the temperature and the driving distance of the target vehicle (S1530).

Figure 22:
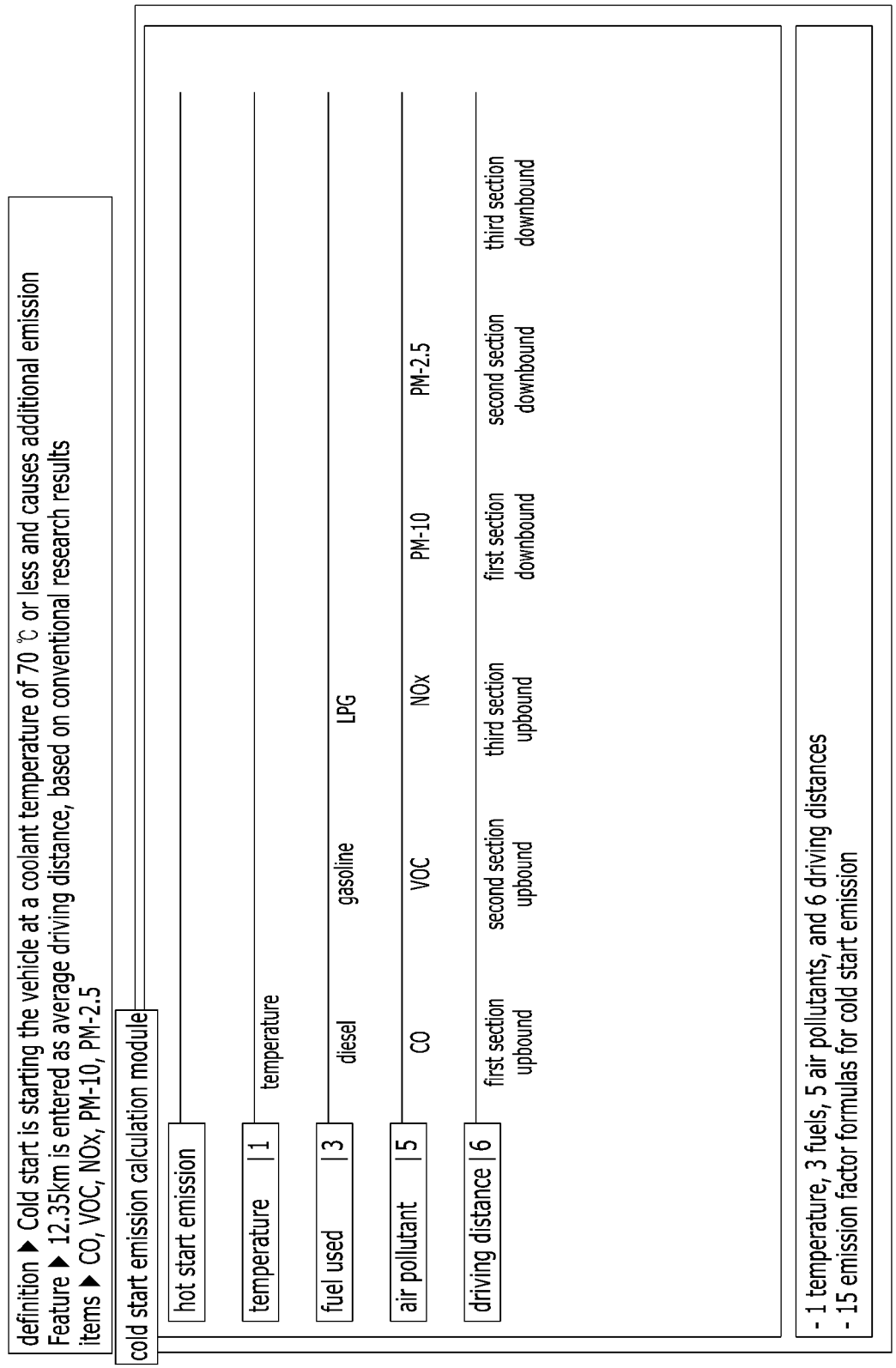

In the example shown in FIG. 22, it may be identified that the cold start emission calculation module 232 calculates the cold start emission based on temperature, fuel used, air pollutants, and driving distance (e.g., mileage).

The deterioration emission calculation module 233 may calculate the deterioration emission amount of each vehicle.

Figure 16:
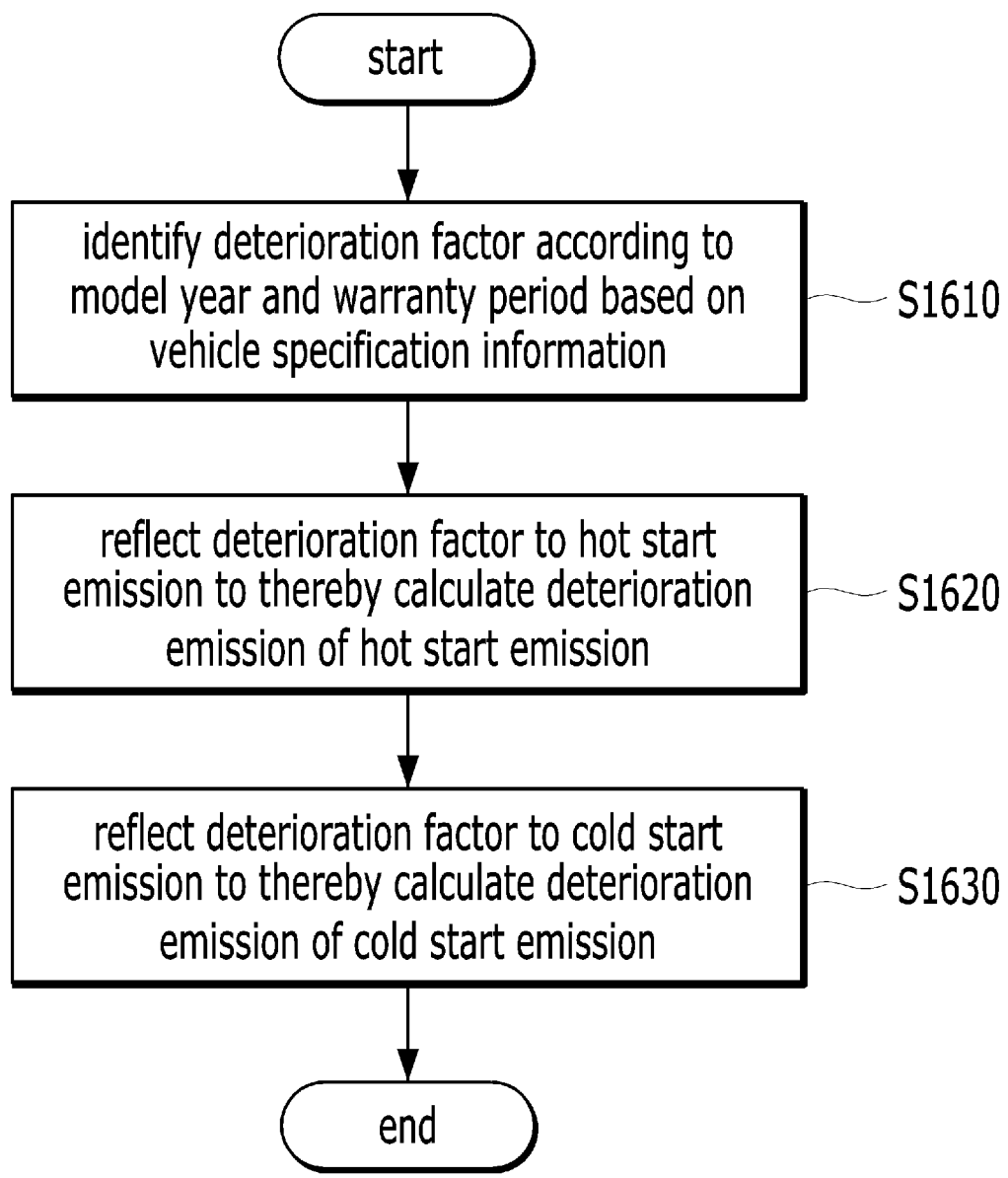
FIG. 16 is a flowchart illustrating an example of calculating deterioration emissions according to an embodiment.

FIG. 16 is a flowchart illustrating an example of calculating deterioration emissions according to an embodiment of the disclosure.

The deterioration emission calculation module 233 may identify the deterioration factor according to the model year and warranty period of the vehicle from the factor setting module 212 based on the specification information of the vehicle (S1610).

The deterioration emission calculation module 233 may calculate the deterioration emission amount of the hot start emission by reflecting the deterioration factor to the hot start emission amount (S1620) and may calculate the deterioration emission amount of the cold start emission by reflecting the deterioration factor to the cold start emission amount (S1630).

Figure 23:
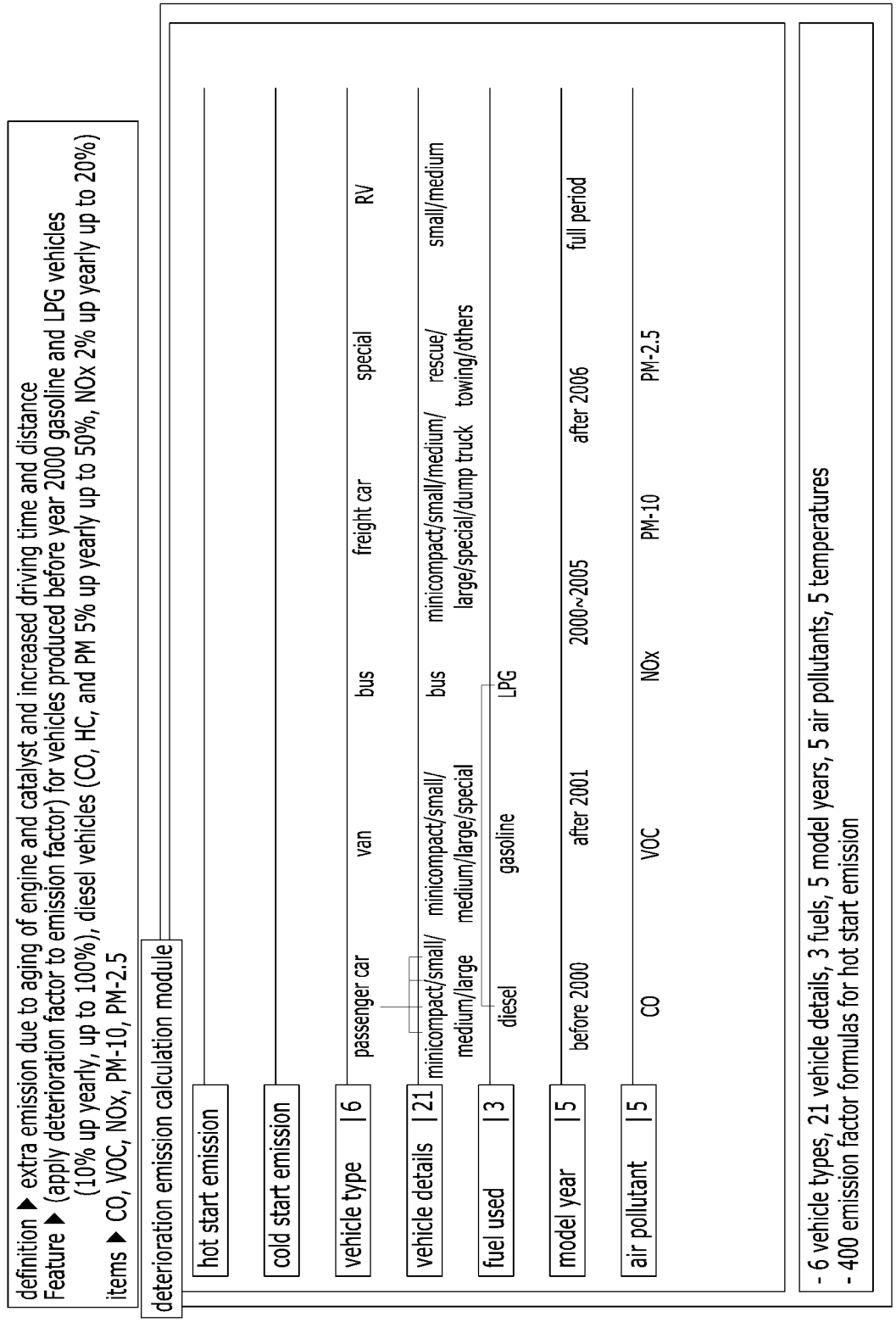

In the example shown in FIG. 23, it may be identified that the deterioration emission calculation module 233 may calculate the hot start emission based on the vehicle type, vehicle type details, fuel used, model year of the vehicle, and air pollutants.

The sulfur oxide emission calculation module 234 may calculate the sulfur oxide emission of each vehicle.

Figure 17:
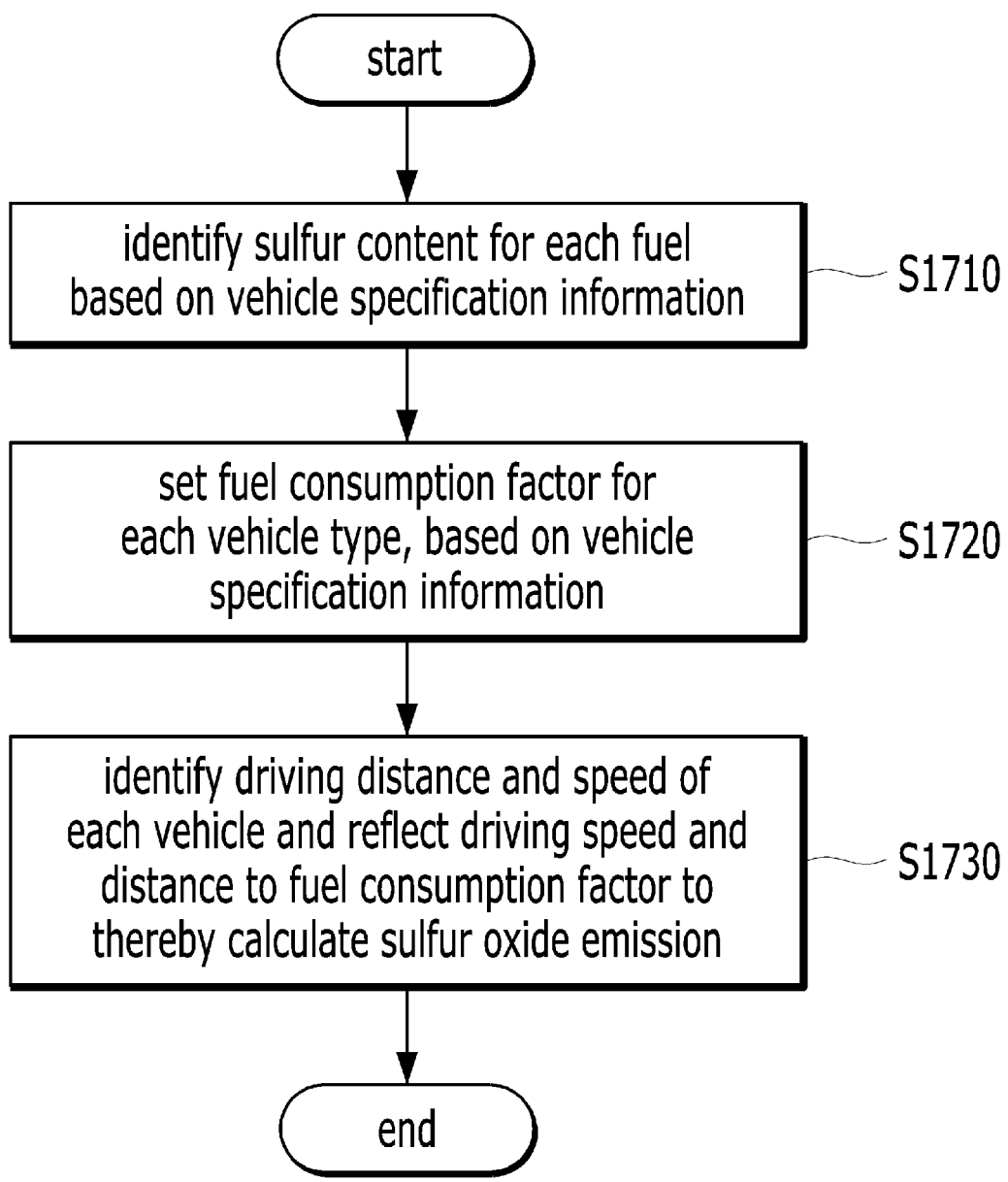
FIG. 17 is a flowchart illustrating an example of calculating sulfur oxide emissions according to an embodiment.

FIG. 17 is a flowchart illustrating an example of calculating sulfur oxide emissions according to an embodiment of the disclosure.

The sulfur oxide emission calculation module 234 may identify the sulfur content, per fuel, from the factor setting module 212 based on the vehicle specification information (S1710).

The sulfur oxide emission calculation module 234 may set a fuel consumption factor (g/km) according to the driving speed for each vehicle type according to the specification information of the vehicle (S1720).

The sulfur oxide emission calculation module 234 may identify the driving distance and driving speed of each vehicle and calculate the amount of sulfur oxide emission by reflecting the driving speed and driving distance to the fuel consumption factor (S1730).

Figure 24:
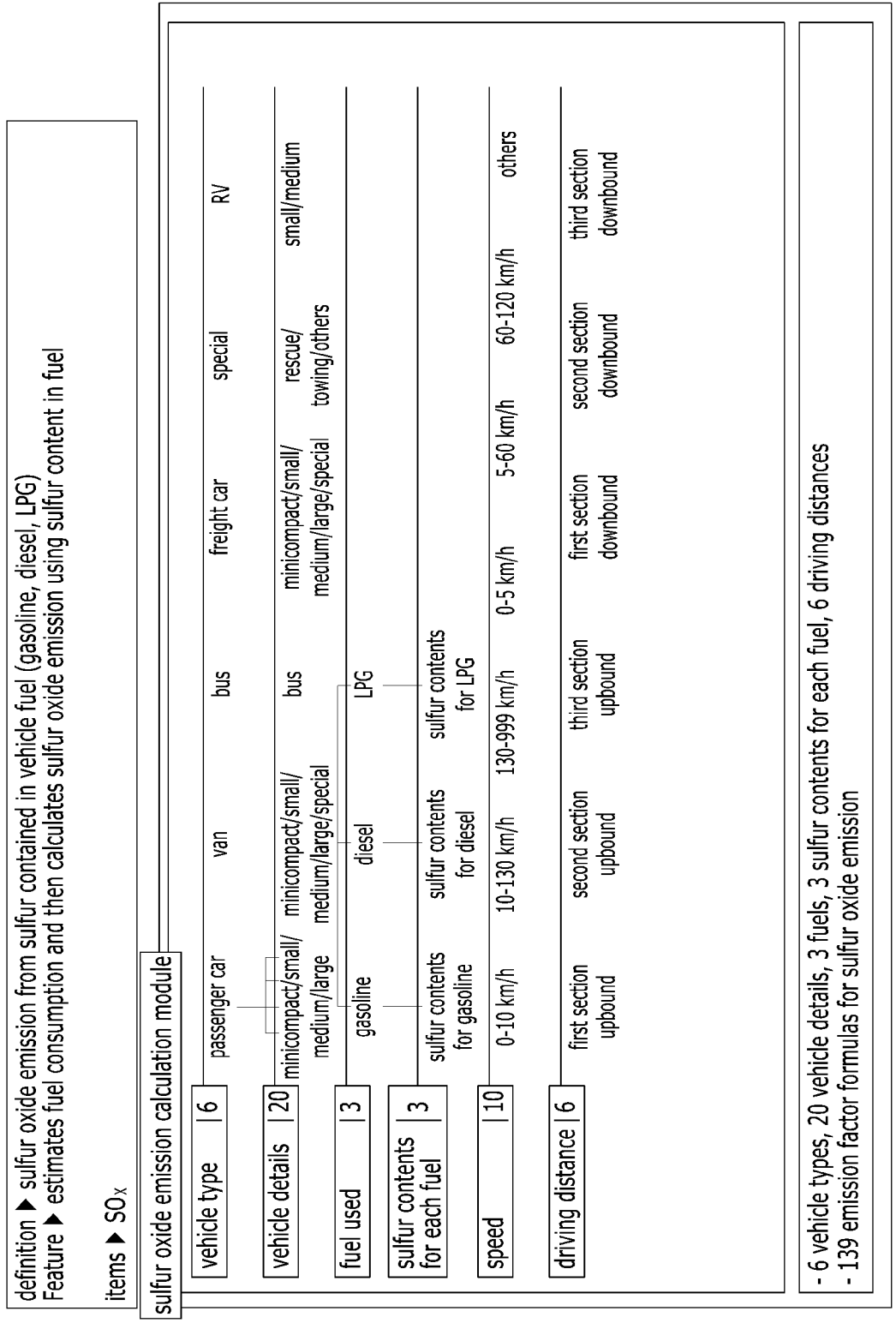

In the example shown in FIG. 24, the sulfur oxide emission calculation module 234 may calculates the deterioration emission based on the vehicle type, vehicle type details, fuel used, content of sulfur per fuel, speed and driving distance.

The evaporation emission calculation module 235 may calculate the evaporation emission in the regional section. The evaporation emission amount is classified into ones due to diurnal loss, hot and warm soak, and running loss, but according to an embodiment, only the evaporation emission due to the driving loss generated by the passage of the regional section may be calculated.

Figure 18:
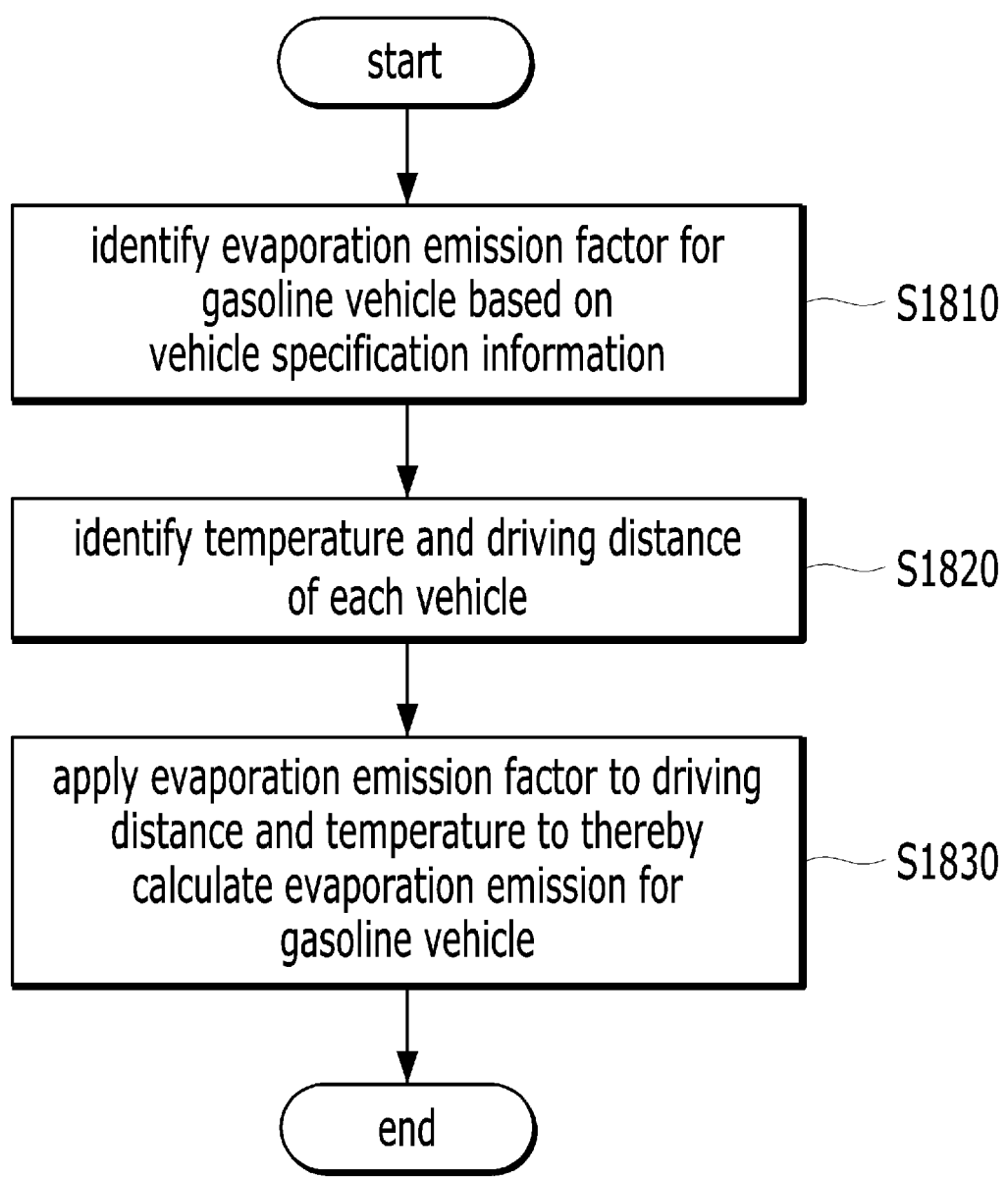
FIG. 18 is a flowchart illustrating an example of calculating evaporation emissions according to an embodiment.

FIG. 18 is a flowchart illustrating an example of calculating evaporation emissions according to an embodiment of the disclosure.

The evaporation emission calculation module 235 may identify the evaporation emission factor for the gasoline vehicle from the factor setting module 212 based on the specification information of the vehicle (S1810). Since diesel and LPG have no evaporative emission, the evaporation emission calculation module 235 may identify the evaporation emission factor only for gasoline vehicles using the vehicle specification information.

Since the evaporation emission factor is affected by the temperature, the evaporation emission calculation module 235 may identify the temperature and the driving distance of each vehicle (S1820).

The evaporation emission calculation module 235 may calculate the evaporation emission amount of the gasoline vehicle by applying the evaporation emission factor to the driving distance and temperature (S1830).

Figure 25:
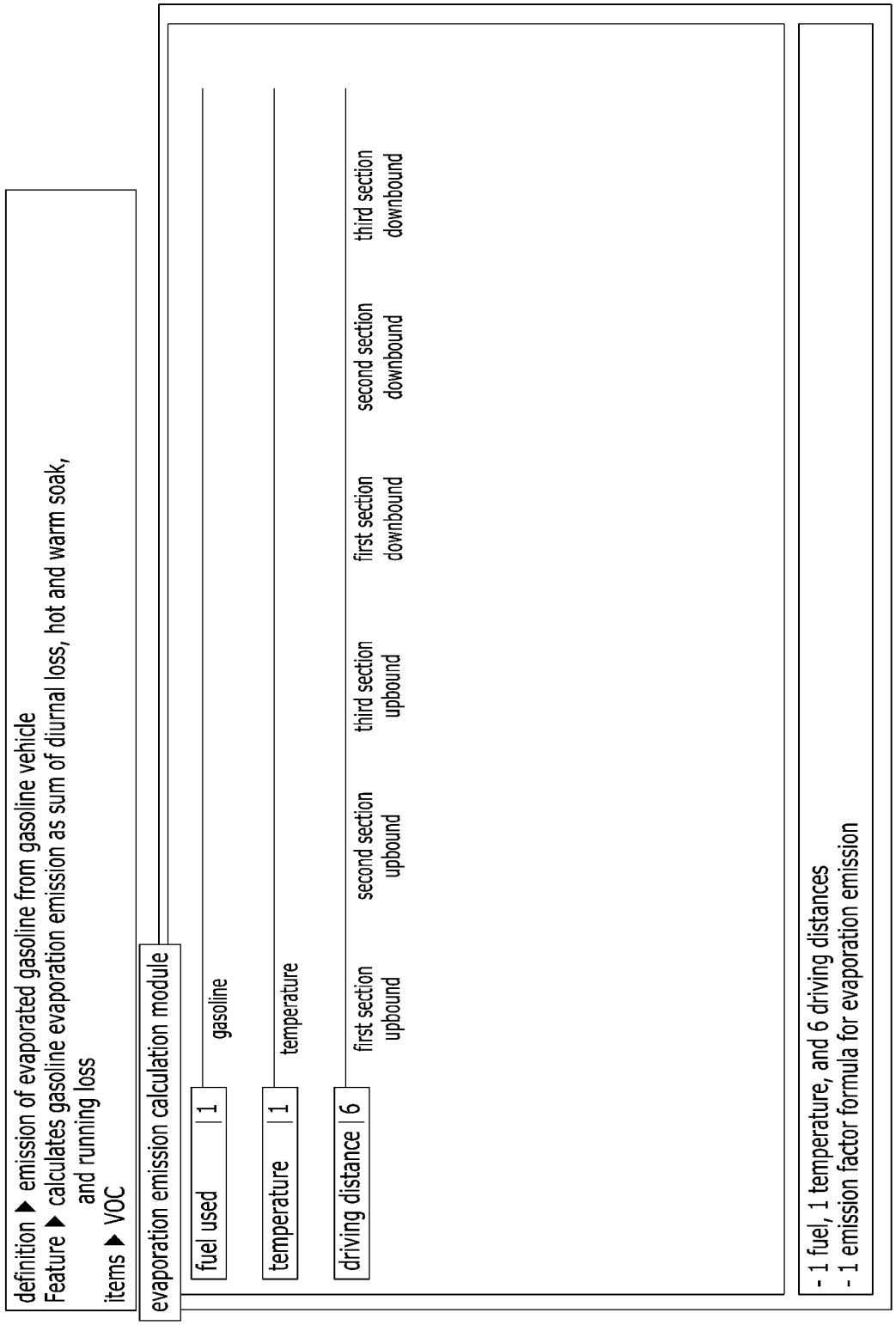

In the example shown in FIG. 25, it may be identified that the evaporation emission calculation module 235 calculates the evaporation emission based on the fuel used, temperature, and driving distance.

The ammonia emission calculation module 236 may calculate the ammonia emission.

Figure 19:
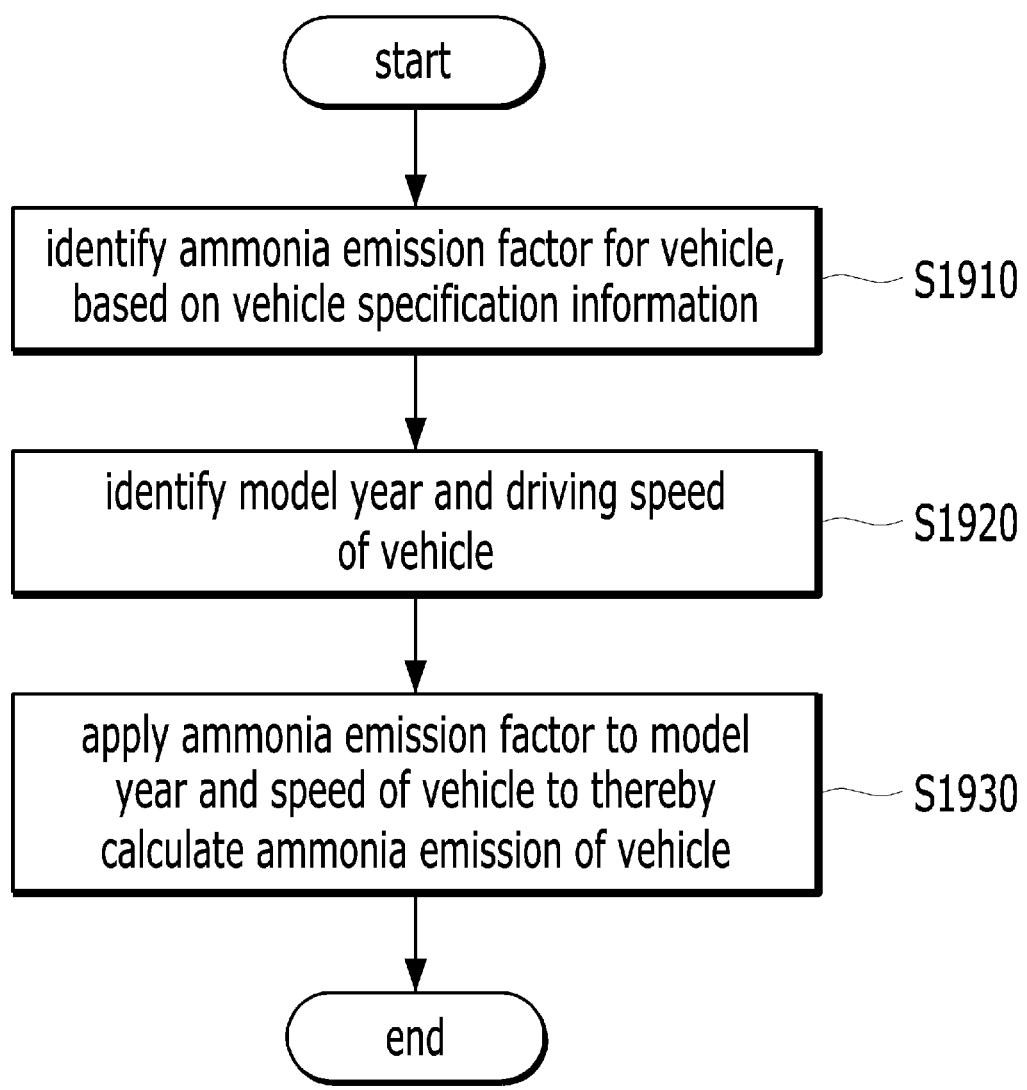
FIG. 19 is a view illustrating an example of calculating ammonia emissions according to an embodiment.

FIG. 19 is a flowchart illustrating an example of calculating ammonia emissions according to an embodiment of the disclosure.

The ammonia emission calculation module 236 may identify the ammonia emission factor from the factor setting module 212 based on the vehicle specification information (S1910).

Since the ammonia emission factor is a value that varies depending on the model year and the driving speed of the vehicle, the ammonia emission calculation module 236 may identify the model year of the vehicle and the driving speed of the vehicle (S1920).

The ammonia emission calculation module 236 may calculate the ammonia emission of each vehicle by applying the ammonia emission factor to the model year and speed of the vehicle (S1930).

In the example shown in FIG. 26, the ammonia emission calculation module 236 may calculates the ammonia emission based on the vehicle type, vehicle type details, fuel used, model year, speed and driving distance.

Figure 12:
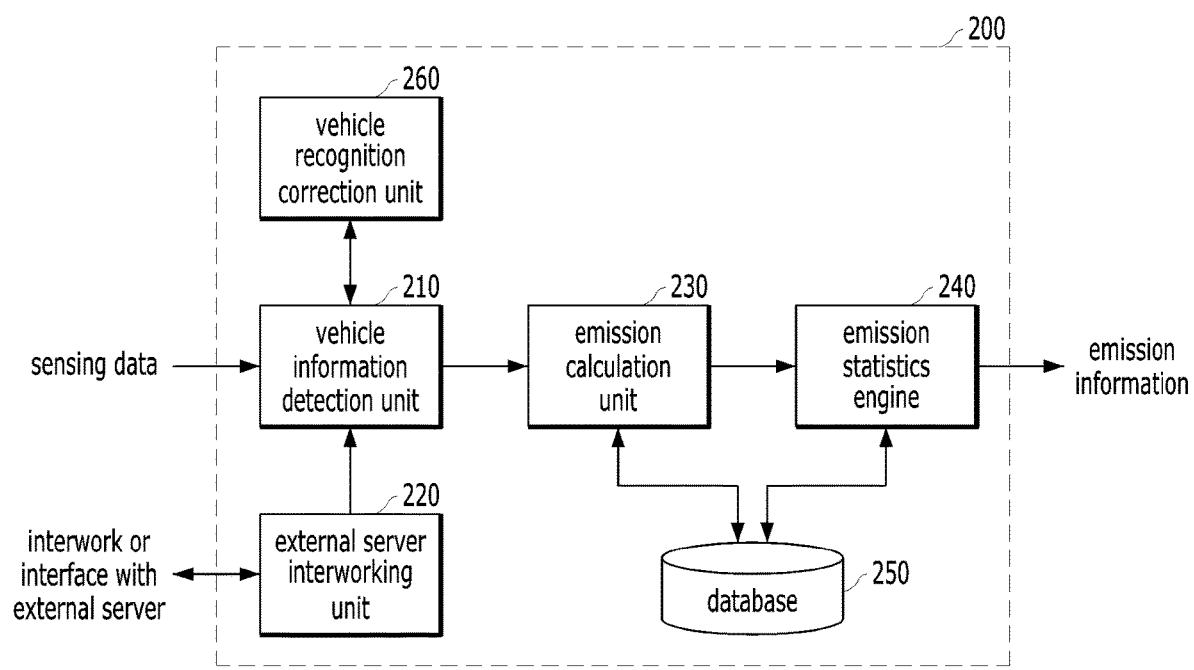
FIG. 12 is a block diagram illustrating a configuration of a management server according to an embodiment.

FIG. 12 is a block diagram illustrating a configuration of a management server according to an embodiment.

Referring to FIG. 12, the management server 200 may include a vehicle information detection unit 210, an external server interworking unit 220, an emission calculation unit 230, an emission statistics engine 240, a database 260, and a vehicle recognition correction unit 260.

The configuration, functions, and operations of the vehicle information detection unit 210 to the database 250 may be easily understood from the description made above with reference to FIGS. 1 to 11, and no repetitive description thereof is given.

The vehicle recognition correction unit 260 may correct the vehicle classification performed by the vehicle information detection unit 210.

For example, the vehicle information detection unit 210 may identify, differentiate, or classify each vehicle as a passenger car, a van, an RV, a freight car, a special car, or a bus based on the external feature points of the vehicle in the captured image. The vehicle recognition correction unit 260 may compare the vehicle information identified from the external server 300 using the vehicle identification information and the vehicle classification recognized by the vehicle information detection unit 210 to thereby determine the recognition rate of the vehicle information detection unit 210 based on Equation 2 below.

$$\text{Recognition rate} = 100(\%) - \text{percent error } (PE) \quad \text{[Equation 2]}$$
$$PE(\%) = \frac{E}{Y} \times 100$$

Here, E is the number of effective vehicles for which the equipment have misrecognized or have not recognized the pattern for each vehicle during the unit analysis time, and Y is the number of vehicles the plate numbers of which have been detected during the unit analysis time.

The vehicle recognition correction unit 260 may identify the classification type of a vehicle whose recognition rate is less than or equal to a predetermined threshold and provide the identified vehicle classification type, as a vehicle type with a low recognition rate, to the vehicle information detection unit 210. The vehicle information detection unit 210 may increase the recognition rate by re-learning external feature points using more learning data for the type of vehicle.

Various examples of the system for calculating air pollutant emissions according to an embodiment of the disclosure have been described above with reference to FIGS. 1 to 12.

Various examples of the method for calculating air pollutant emissions according to an embodiment of the disclosure are described below with reference to FIGS. 13 to 19.

Since the air pollutant emission calculation method may be performed based on the air pollutant emission calculation system described above, the air pollutant emission calculation method may easily be understood from the description made above with reference to FIGS. 1 to 12.

Figure 13:
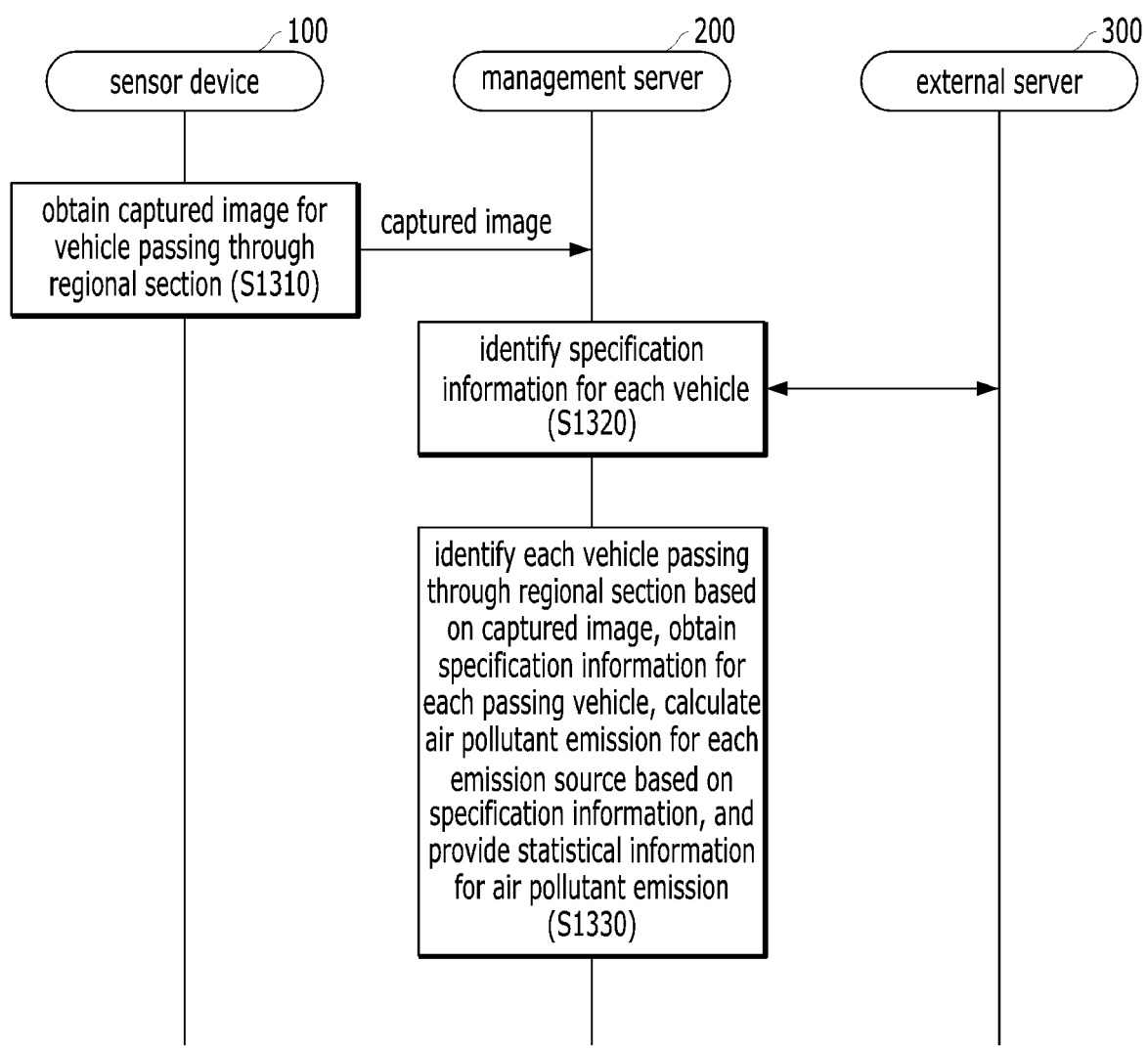
FIG. 13 is a block diagram illustrating a configuration of a management server according to an embodiment.

FIG. 13 is a flowchart illustrating a method for calculating air pollutant emissions according to an embodiment.

Referring to FIG. 13, captured images of vehicles passing through a corresponding regional section are obtained using sensor devices 100 installed in an regional section (S1310).

The management server 200 may identify the specification information for each vehicle using the external server 300 (S1320).

The management server 200 may identify each of the vehicles passing through the regional section based on the captured image provided from the sensor device 100, obtain specification information for each identified vehicle from the external server 300, calculate the emission for each air pollutant and for each emission source, using the specification information, and provide statistical information for the air pollutant emission (S1330).

In an embodiment of step S1330, the management server 200 may generate vehicle identification information for vehicles passing through the regional section using the captured image and may detect vehicle classifications and speed information for the vehicles from the driving environment setting module 213. Thereafter, the management server 200 may obtain specification information for vehicles from the external server 300 by using the vehicle identification information.

The management server 200 may set an emission factor for each air pollutant based on the vehicle information provided by the vehicle information detection unit and calculate emission for each of a plurality of emission sources using the emission factors.

FIG. 14 is a flowchart illustrating an example of calculating hot start emission according to an embodiment. FIG. 15 is a flowchart illustrating an example of calculating cold start emission according to an embodiment of the disclosure. FIG. 16 is a flowchart illustrating an example of calculating deterioration emission according to an embodiment of the disclosure.

An example of calculating the emission of each of a plurality of emission sources is described below with reference to FIGS. 14 to 16.

Referring to FIG. 14, the management server 200 may identify the emission factor of pollutants according to the vehicle type, vehicle type details, model year, driving speed and fuel of the target vehicle from the external server based on the vehicle specification information (S1410) and may identify the driving speed and the driving distance for each section of the target vehicle (S1420). The management server 200 may calculate the pollutant emission in the hot start situation by reflecting the emission factor for each pollutant (S1430).

Referring to FIG. 15, the management server 200 may identify the hot-to-cold emission ratio of the target vehicle from the factor setting module 212 based on the vehicle specification information (S1510) and may identify the temperature for the section, where the target vehicle is present, and the driving distance, for each section, of the target vehicle (S1430). The management server 200 may calculate the cold start pollutant emission by reflecting the hot-to-cold emission ratio to the hot start emission based on the temperature and the driving distance (S1530).

Referring to FIG. 16, the management server 200 may identify the deterioration factor according to the model year and warranty period of the target vehicle from the factor setting module 212 based on the specification information of the vehicle (S1610) and may calculate the deterioration emission amount of hot start emission by reflecting the deterioration factor to the hot start emission (S1620). The management server 200 may calculate the deterioration emission amount of the cold start emission by reflecting the deterioration factor to the cold start emission (S1630).

FIG. 17 is a flowchart illustrating an example of calculating sulfur oxide emission according to an embodiment. FIG. 18 is a flowchart illustrating an example of calculating evaporation emission according to an embodiment of the disclosure. FIG. 19 is a flowchart illustrating an example of calculating ammonia emission according to an embodiment of the disclosure.

An example of calculating the emission of each of a plurality of emission sources is described below with reference to FIGS. 17 to 19.

Referring to FIG. 17, the management server 200 may identify the sulfur content for each fuel for the target vehicle from the factor setting module 212 based on the specification information of the vehicle (S1710) and may set a fuel consumption factor according to the driving speed, for each vehicle, based on the vehicle specification information (S1720). The management server 200 may identify the driving distance and driving speed of each vehicle and calculate the amount of sulfur oxide emission by reflecting the driving speed and driving distance to the fuel consumption factor (S1730).

Referring to FIG. 18, the management server 200 may identify the evaporation emission factor for the gasoline vehicle from the factor setting module 212 based on the specification information of the vehicle (S1810) and may identify the temperature and the driving distance of each vehicle (S1820). The management server 200 may calculate the evaporation emission amount of the gasoline vehicle by applying the evaporation emission factor to the driving distance and temperature (S1830).

Referring to FIG. 19, the management server 200 may identify the ammonia emission factor for the target vehicle from the factor setting module 212 based on the specification information of the vehicle (S1910) and may identify the model year and the driving distance of the target vehicle (S1920). The management server 200 may calculate the ammonia emission of the target vehicle by applying the ammonia emission factor to the model year and speed of the target vehicle (S1930).

Although the disclosure has been described with reference to embodiments thereof, it would be apparent to one of ordinary skill in the art that various changes or modifications may be made thereto without departing from the scope of the disclosure as defined by the appended claims.

What is claimed is:

1. A system for calculating air pollutant emission, the system comprising:
   a sensor device installed in a regional section and obtaining a captured image of a vehicle passing through the regional section;
   an external server storing vehicle specification information; and
   a management server identifying the vehicle based on the captured image provided from the sensor device, obtaining the vehicle specification information for the identified vehicle from the external server, calculating air pollutant emission for each emission source using the vehicle specification information, and providing statistical information for the air pollutant emission, wherein the management server includes:
   a vehicle information detection unit generating vehicle identification information for the vehicle passing through the regional section using the captured image and detecting a vehicle classification and speed information for the vehicle;
   an external server interworking unit obtaining the vehicle specification information from the external server, using the vehicle identification information; and
   an emission calculation unit setting an emission factor for each air pollutant based on the vehicle identification information provided by the vehicle information detection unit and calculating the emission for each of a plurality of emission sources using the emission factor, wherein the emission calculation unit includes:
   a hot start emission calculation module identifying the emission factor of the air pollutant according to a driving speed and fuel type of the vehicle, using the vehicle specification information including a vehicle type, vehicle type details, and model year of a target vehicle from the external server, identifying a driving speed and per-section driving distance of the target vehicle, and calculating the air pollutant emission in a hot start situation based on the driving speed and the per-section driving distance and the emission factor for each air pollutant;

a cold start emission calculation module identifying a hot-to-cold emission ratio of the target vehicle from the factor setting module based on the vehicle specification information, identifying a temperature for a section where the target vehicle is present and the per-section driving distance of the target vehicle, and calculating cold start emission based on the hot-to-cold emission ratio and hot start emission based on the temperature and the driving distance; and a deterioration emission calculation module identifying a deterioration factor due to a model year and warranty period for the target vehicle from the factor setting module, based on the vehicle specification information, and calculating a deterioration emission amount of the hot start emission based on the deterioration factor and the hot start emission, and calculating the deterioration emission amount of the cold start emission based on the deterioration factor and the cold start emission.

2. The system of claim 1, wherein the emission sources include hot start emission, cold start emission, deterioration emission, evaporation emission, sulfur oxide emission and ammonia emission.

3. The system of claim 1, wherein the management server further includes:

a database storing the vehicle identification information detected by the vehicle information detection unit and emission data obtained by the emission calculation unit; and an emission statistics engine generating and providing statistical data by statisticalizing the data stored in the database according to a user's setting.

4. The system of claim 3, wherein the emission statistics engine generates the statistical data by setting time series analysis, section analysis, vehicle type analysis, fuel analysis, emission type analysis, and air pollutant analysis as analysis criteria.

5. The system of claim 1, wherein the emission calculation unit further includes:

a sulfur oxide emission calculation module identifying the driving distance and driving speed of the vehicle using the vehicle specification information, identifying a per-fuel sulfur content for the target vehicle and a fuel consumption factor according to the driving speed, per vehicle type, and calculating sulfur oxide emission based on the driving speed and the driving distance, and the fuel consumption factor;

an evaporation emission calculation module identifying an evaporation emission factor for a gasoline vehicle from the factor setting module based on the vehicle specification information, identifying the temperature and the driving distance of the vehicle, and calculating evaporation emission of the gasoline vehicle based on the evaporation emission factor and the driving distance and the temperature; and an ammonia emission calculation module identifying an ammonia emission factor for the target vehicle from the factor setting module based on the vehicle specification information, identifying the model year and driving speed of the target vehicle, and calculating ammonia emission based on the ammonia emission factor, and the model year and driving speed of the target vehicle.

6. A method for calculating air pollutant emission, the method comprising:

obtaining a captured image for a vehicle passing through a regional section using a sensor device installed in the regional section;

identifying vehicle specification information using an external server; and identifying, by a management server, the vehicle based on the captured image provided from the sensor device, obtaining the vehicle specification information for the identified vehicle from the external server, calculating air pollutant emission for each emission source using the vehicle specification information, and providing statistical information for the air pollutant emission, wherein providing the statistical information for the air pollutant emission includes:

generating, by the management server, vehicle identification information for the vehicle passing through the regional section using the captured image and detecting a vehicle classification and speed information for the vehicle;

obtaining, by the management server, the vehicle specification information using the vehicle identification information; and setting, by the management server, an emission factor for each air pollutant based on the vehicle identification information and calculating the emission for each of a plurality of emission sources using the emission factor, wherein calculating the emission for each of the plurality of emission sources includes:

identifying, by the management server, the emission factor of the air pollutant according to a vehicle type, vehicle type details, and model year of a target vehicle, based on the vehicle specification information, identifying a driving speed and per-section driving distance of the target vehicle, and calculating the air pollutant emission in a hot start situation based on the driving speed and the per-section driving distance, and the emission factor for each air pollutant;

identifying, by the management server, a hot-to-cold emission ratio of the target vehicle based on the vehicle specification information, identifying a temperature for a section where the target vehicle is present and the per-section driving distance of the target vehicle, and calculating cold start emission based on the hot-to-cold emission ratio and hot start emission based on the temperature and the driving distance; and identifying, by the management server, a deterioration factor due to a model year and warranty period for the target vehicle, based on the vehicle specification information, calculating a deterioration emission amount of the hot start emission based on the deterioration factor and the hot start emission, and calculating the deterioration emission amount of the cold start emission based on the deterioration factor to the cold start emission.

7. The method of claim 6, wherein calculating the emission for each of the plurality of emission sources includes:

identifying, by the management server, a per-fuel sulfur content for the target vehicle based on the vehicle specification information, setting a fuel consumption factor according to the driving speed, per vehicle type, based on the vehicle specification information, identifying the driving distance and driving speed of the vehicle, and calculating sulfur oxide emission based on the driving speed and the driving distance, and the fuel consumption factor;

identifying, by the management server, an evaporation emission factor for a gasoline vehicle based on the vehicle specification information, identifying the temperature and the driving distance of the vehicle, and calculating evaporation emission of the gasoline vehicle based on the evaporation emission factor to the driving distance and the temperature; and identifying, by the management server, an ammonia emission factor for the target vehicle based on the vehicle specification information, identifying the model year and driving speed of the target vehicle, and calculating ammonia emission based on the ammonia emission factor and the model year and driving speed of the target vehicle.

* * * * *